United States Patent
Cross et al.

(10) Patent No.: US 9,112,215 B1
(45) Date of Patent: Aug. 18, 2015

(54) NITRIC ACID REGENERATION FUEL CELL SYSTEMS

(71) Applicants: Tsali Cross, Bothell, WA (US); Derek Reiman, Bothell, WA (US); Corina Margineanu, Bothell, WA (US)

(72) Inventors: Tsali Cross, Bothell, WA (US); Derek Reiman, Bothell, WA (US); Corina Margineanu, Bothell, WA (US)

(73) Assignee: NEAH POWER SYSTEMS, INC., Bothell, WA (US)

( * ) Notice: Subject to any disclaimer, the term of this patent is extended or adjusted under 35 U.S.C. 154(b) by 230 days.

(21) Appl. No.: 13/721,055

(22) Filed: Dec. 20, 2012

Related U.S. Application Data

(63) Continuation-in-part of application No. 10/966,721, filed on Oct. 15, 2004.

(60) Provisional application No. 60/512,629, filed on Oct. 17, 2003.

(51) Int. Cl.
*H01M 8/18* (2006.01)
*H01M 8/22* (2006.01)

(52) U.S. Cl.
CPC ............. *H01M 8/18* (2013.01); *H01M 8/222* (2013.01)

(58) Field of Classification Search
None
See application file for complete search history.

(56) References Cited

U.S. PATENT DOCUMENTS

| | | | |
|---|---|---|---|
| 3,350,227 A * | 10/1967 | Moerikofer et al. | 429/417 |
| 2005/0084738 A1 * | 4/2005 | Ohlsen et al. | 429/39 |
| 2010/0071780 A1 * | 3/2010 | Sprague | 137/147 |

* cited by examiner

*Primary Examiner* — Jonathan Crepeau

(57) ABSTRACT

Methods and systems for regenerating a fuel cell are disclosed, comprising sparging a catholyte liquid with a gaseous oxygen-containing flow stream. In addition, the gaseous byproducts in the catholyte can be collected and then converted to liquid forms for easy disposal. In some embodiments, the regeneration process comprises intermittently regenerating an oxidant flow stream, for example, based on detected conditions. In some embodiments, the regeneration process comprises switching between different modes of oxidant regeneration, for example, based on detected conditions.

10 Claims, 19 Drawing Sheets

Operating a fuel cell device comprising a nitric acid oxidant
1350

Sparging a gas through the spent flow stream of nitric acid
1360

Collecting unreacted $NO_x$
1370

Reacting $NO_x$ with $H_2O_2$
1380

NITRIC ACID REGENERATION FUEL CELL SYSTEMS

This application is a continuation-in-part of application Ser. No. 10/966,721, filed on Oct. 15, 2004, which claims the benefit of U.S. Provisional Application No. 60/512,629 filed on Oct. 17, 2003, which applications are incorporated herein by reference in their entirety for all purposes.

TECHNICAL FIELD

The present invention relates generally to fuel cells and, more particularly, to nitric acid regeneration fuel cell systems having a recirculating nitric acid catholyte flow stream that is regenerated with a hydrogen peroxide flow stream, as well as to related methods.

BACKGROUND OF THE INVENTION

A fuel cell is an energy conversion device that consists essentially of two opposing electrodes, an anode and a cathode, ionically connected together via an interposing electrolyte. Unlike a battery, fuel cell reactants are supplied externally rather than internally. Fuel cells operate by converting fuels, such as hydrogen or a hydrocarbon (e.g., methanol), to electrical power through an electrochemical process rather than by combustion. It does so by harnessing the electrons released from controlled oxidation-reduction reactions occurring on the surface of a catalyst. A fuel cell can produce electricity continuously so long as proper reactants are supplied from an outside source.

With respect to state-of-the-art fuel cell systems generally, several different configurations and structures have been contemplated. In this regard, existing fuel cell systems are typically classified based on one or more criteria, such as, for example: (1) the type of fuel and/or oxidant used by the system, (2) the type of electrolyte used in the electrode stack assembly, (3) the steady-state operating temperature of the electrode stack assembly, and (4) whether the fuel is processed outside (external reforming) or inside (internal reforming) the electrode stack assembly. In general, however, it is perhaps most customary to classify existing fuel cell systems by the type of electrolyte (i.e., ion conducting media) employed within the electrode stack assembly. Accordingly, most state-of-the-art fuel cell systems have been classified into one of the following known groups:

1. Phosphoric acid fuel cells (e.g., phosphoric acid electrolyte);
2. Alkaline fuel cells (e.g., KOH electrolyte);
3. Molten carbonate fuel cells (e.g., $Li_2CO_3/K_2CO_3$ electrolyte);
4. Solid oxide fuel cells (e.g., yttria-stabilized zirconia electrolyte);
5. Proton exchange membrane fuel cells (e.g., NAFION electrolyte).

Unfortunately, existing state-of-the-art fuel cell systems are not entirely satisfactory for the production of small-scale portable direct feed fuel cell systems, in part, because of problems associated with achieving a small form factor while maintaining a relatively high power density. In addition, existing fuel cell technology has not addressed many of the concomitant problems associated with closed circulating microfluidic liquid feed fuel cell systems adapted for use with portable electronic devices. More specifically, and at the present time, there has been very little in way of research and development directed toward nitric acid regeneration fuel cell systems having a recirculating nitric acid catholyte flow stream. Previous known fuel cell systems that have contemplated the use and regeneration of a nitric acid catholyte flow stream include, for example, those systems disclosed in U.S. Pat. No. 3,261,717, U.S. Pat. No. 3,281,274, U.S. Pat. No. 3,318,735, U.S. Pat. No. 3,350,227, U.S. Pat. No. 3,979,225, and U.S. Pat. No. 4,528,250. Most all of these systems, however, use a nitric acid catholyte flow stream that is regenerated with oxygen gas from the air; and as such, these fuel cell systems are not optimal for working within a closed recirculating microfluidic liquid feed fuel cell system adapted for use with a portable electronic device.

Accordingly, there is still a need in the art for new and improved nitric acid regeneration fuel cell systems. More specifically, there is a need for nitric acid regeneration fuel cell systems having a recirculating nitric acid catholyte flow stream that is regenerated with a secondary oxidant flow stream, and that incorporates microfluidic and microelectromechanical systems ("MEMS") technologies so as to achieve a high power density within a small form factor. The present invention fulfills these needs and provides for further related advantages.

SUMMARY OF THE DESCRIPTION

In some embodiments, the present invention discloses methods and systems for regenerating a fuel cell, comprising sparging a catholyte liquid with a gaseous oxygen-containing flow stream. For example, a fuel cell can utilize nitric acid in a catholyte flow stream, which then reacts at a cathode to generate nitrogen oxide. Air can be bubbled into the catholyte liquid to convert the nitrogen oxide back to liquid nitric acid.

In some embodiments, the unreacted nitrogen oxide are collected and then converted to liquid forms for easy disposal. For example, the nitrogen oxide can be collected and routed to a hydrogen peroxide reservoir, where the gaseous nitrogen oxide can react with hydrogen peroxide to form liquid nitric acid, which can be easier to be disposed as compared to the gaseous nitrogen oxide.

In some embodiments, the present invention discloses methods and systems for regenerating a fuel cell, comprising intermittently regenerating an oxidant flow stream, for example, based on detected conditions. For example, the fuel cell can comprise a sensor for detecting conditions of the fuel cell, such as the concentration of the catholyte effluent flow stream or the catholyte reservoir, the power of fuel cell, or the number of running cycles of the fuel cell. Based on the inputs from the sensor, a regenerating assembly can start to regenerate the catholyte liquid.

In some embodiments, the present invention discloses methods and systems for regenerating a fuel cell, comprising switching between different modes of oxidant regeneration, for example, based on detected conditions. For example, the regeneration can switch from air regeneration to hydrogen peroxide regeneration when air quality is not appropriate for fuel cell regeneration.

BRIEF DESCRIPTION OF THE DRAWINGS

The drawings are intended to be illustrative and symbolic representations of certain exemplary embodiments of the present invention and as such they are not necessarily drawn to scale.

DETAILED DESCRIPTION OF THE PREFERRED EMBODIMENTS

Figure 1:
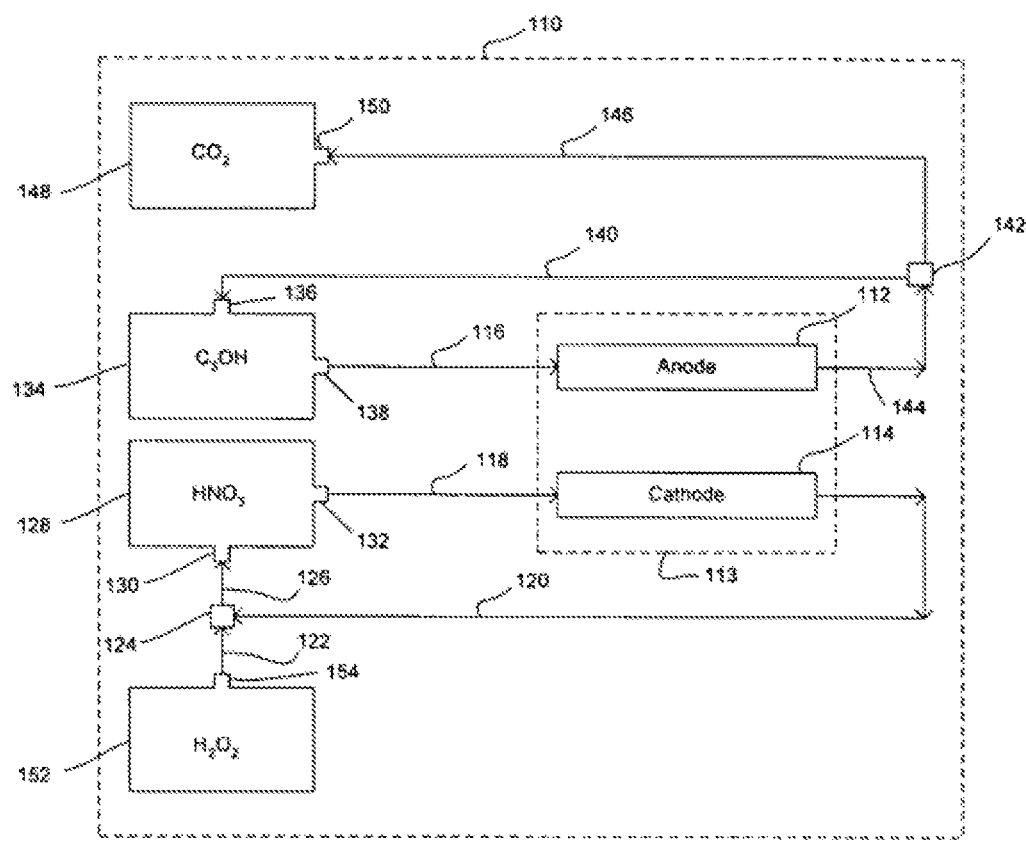
FIG. 1 illustrates a schematic flow diagram of a nitric acid regeneration fuel cell system in accordance with an embodiment of the present invention.

In some embodiments, the present invention disclosed herein is directed to nitric acid regeneration fuel cell systems that comprise: an anode; a cathode confronting and spaced apart from the anode; an anolyte flow stream configured to flowingly contact the anode, wherein the anolyte flow stream includes a fuel, preferably methanol, for reacting at the anode; a catholyte flow stream configured to flowingly contact the cathode, wherein the catholyte flow stream includes nitric acid for reacting at the cathode to thereby yield cathode reaction products that include nitrogen oxide and water in a catholyte effluent flow stream; and a regeneration flow stream, such as air or hydrogen peroxide, configured to contact and react with the nitrogen oxide of the catholyte effluent flow stream to thereby yield a regenerated nitric acid flow stream.

Preferably, the regenerated nitric acid flow stream is reused in the catholyte flow stream. In addition, the anolyte flow stream may include methanol and a sulfuric acid electrolyte, wherein the molarity of the methanol is about 1 to about 5 and the molarity of the sulfuric acid is greater than about 1. The flow rate of the anolyte flow stream generally ranges from about 2 µL/min to about 1 mL/min. Similarly, the catholyte flow stream is preferably a solution of nitric acid and sulfuric acid, wherein the molarity of the nitric acid is greater than about 0.5 and the molarity of the sulfuric acid is greater than about 1. The flow rate of the catholyte flow stream generally also ranges from about 2 µL/min to about 1 mL/min. The hydrogen peroxide flow stream is preferably a solution of hydrogen peroxide, wherein the hydrogen peroxide has a concentration of about 50 to about 70 weight percent. The flow rate of the hydrogen peroxide flow stream generally also ranges from about 2 µL/min to about 1 mL/min.

In some embodiments, the present invention is directed to a nitric acid regeneration fuel cell system, comprising: a flow-through anode; a flow-through or flow-by cathode confronting and spaced apart from the anode; a plenum interposed between and contiguous with at least a portion of the flow-through anode and cathode; an anolyte flow stream that passes through the flow-through anode and into the plenum, wherein the anolyte flow stream includes a fuel (e.g. methanol) for reacting at the anode; a catholyte flow stream that passes through the flow-through cathode and into the plenum, wherein the catholyte flow stream includes nitric acid for reacting at the cathode to thereby yield cathode reaction products that include nitrogen oxide (including nitric oxide) and water in a catholyte effluent flow stream, wherein the catholyte flow stream laminarly flows adjacent to the flow-through or flow-by cathode; and an oxidant generation flow stream (such as air or hydrogen peroxide) that contacts and reacts with the nitric oxide of the catholyte effluent flow stream at a hydrogen peroxide oxidation zone to thereby yield a regenerated nitric acid flow stream. The flux rates of the anolyte and catholyte flow streams through the flow-through anode and the flow-through or flow-by cathode, respectively, generally ranges from about 10 µL/min/cm$^2$ to about 5 mL/min/cm$^2$, whereas the flow rate of the hydrogen peroxide flow stream ranges from about 2 µL/min to about 1 mL/min.

In some embodiments, the present invention is directed to a method of operating an electronic device comprising at least the following steps: providing and operating the nitric acid regeneration fuel cell system so as to generate an electrical current; and connecting the electrical current to the electronic device to thereby effectuate its operation.

These and other aspects of the several inventive embodiments disclosed herein will become more evident upon reference to the following detailed description and attached drawings. It is to be understood, however, that various changes, alterations, and substitutions may be made to the specific embodiments disclosed herein without departing from their essential spirit and scope. In addition, it is to be further understood that the drawings are intended to be illustrative and symbolic representations of certain exemplary embodiments of the present invention and as such they are not necessarily drawn to scale. Finally, it is expressly provided that all of the various references cited in this specification are incorporated herein by reference in their entireties for all purposes.

As noted above, the present invention is directed to a nitric acid regeneration fuel cell system having a recirculating nitric acid catholyte flow stream that is regenerated with an oxidant regeneration flow stream such as air or hydrogen peroxide. As is appreciated by those skilled in the art, a fuel cell system generally comprises a stack of electrode assemblies (referred to as an electrode stack assembly), wherein each individual electrode assembly consists essentially of two opposing electrode structures, an anode and a cathode, ionically connected together via an interposing electrolyte (e.g., polymer membrane and/or electrolyte flow stream). The interposing electrolyte of most conventional direct fuel cell systems (e.g., direct methanol fuel cell (DMFC) systems) generally consists of a solid polymer membrane (e.g., NAFION). Electrode pair assemblies having a solid polymer electrolyte (SPE) membrane are commonly referred to as membrane electrode assemblies (MEAs).

Some advanced type of fuel cell systems use "flow-through" electrodes in conjunction with microfluidic flow channels and flow cells for flowing reactant flow streams (i.e., electrolytic fuel and oxidant flow streams referred to herein as anolyte and catholyte flow streams, respectively) adjacent to and/or through discrete regions of the accompanying electrode structures. As used herein, the term "microfluidic" simply refers to an article of manufacture that has one or more flow channels or flow cells with at least one dimension less than about 1 millimeter (mm). Unlike conventional direct fuel cell systems that utilize SPE membranes as the sole interposing electrolyte (of an electrode pair assembly), fuel cell systems that utilize "flow-through" electrode pair assemblies generally use "parallel" and/or "cross-flowing" (i.e., non-parallel) laminar liquid anolyte and catholyte flow streams that have an acidic electrolyte component (e.g., H$_2$SO$_4$ or triflic acid) that serves as the interposing electrolyte (optionally having an additional interposing separator or third laminar electrolyte flow stream). In this way, protons (H$^+$) liberated at the anode are able to migrate through the interposing flowing anolyte and catholyte (within a flow cell) and combine with oxidant at the catalyst surface of the opposing cathode to yield reaction products. Exemplary in this regard are the fuel cell systems disclosed in commonly owned U.S. Patent Publication No. 2004/0096721 A1, which publication is incorporated herein by reference.

In view of the foregoing and with respect to nitric acid regeneration fuel cell systems of certain preferred embodiments of the present invention (and that may have conventional or flow-through electrodes), anolyte and catholyte flow streams are used to react methanol at an anode and nitric acid at a cathode. In this preferred fuel cell system, the electrochemical reactions occurring are believed to be essentially as follows:

$$\text{Anode: } CH_3OH + H_2O \rightarrow 6H^+ + 6e^- + CO_2 \quad (1)$$

$$\text{Cathode: } 2HNO_3 + 6H^+ + 6e^- \rightarrow 2NO + 4H_2O \quad (2)$$

$$\text{Net: } CH_3OH + 2HNO_3 \rightarrow 2NO + 3H_2O + CO_2 \quad (3)$$

In such a system and in order to reuse the catholyte effluent in a recirculating-type of fuel cell system having methanol as the fuel and nitric acid as the oxidant, it is desirable to oxidize the primary reaction product nitrogen oxide ($NO_x$) such as nitric oxide (NO) back to nitric acid ($HNO_3$). Therefore, and in accordance with some embodiments of the present invention, hydrogen peroxide ($H_2O_2$) is used to contact and react with the nitric oxide (NO) of the catholyte effluent to thereby yield regenerated nitric acid ($HNO_3$), which, in turn, may be used again to react at the cathode. The overall chemical reactions occurring in this novel recirculating-type of nitric acid regeneration system are believed to be essentially as follows:

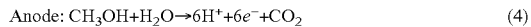

Anode: $CH_3OH+H_2O \rightarrow 6H^+ + 6e^- + CO_2$     (4)

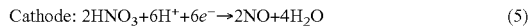

Cathode: $2HNO_3 + 6H^+ + 6e^- \rightarrow 2NO + 4H_2O$     (5)

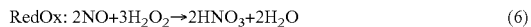

RedOx: $2NO + 3H_2O_2 \rightarrow 2HNO_3 + 2H_2O$     (6)

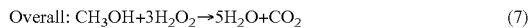

Overall: $CH_3OH + 3H_2O_2 \rightarrow 5H_2O + CO_2$     (7)

In addition, and assuming that the fuel cell system (in one exemplary embodiment) has (1) an anolyte flow stream that consists essentially of a 13.3M $CH_3OH$/4M $H_2SO_4$ solution (1:1 molar ratio of $CH_3OH$:$H_2O$), (2) a catholyte flow stream that consists essentially of a 2M $HNO_3$/4M $H_2SO_4$ solution, and (3) a hydrogen peroxide flow stream that consists essentially of a 70% by weight solution of $H_2O_2$, then the estimated flow rates at an arbitrarily selected power level of 5.5 W is set forth below in Table 1.

TABLE 1

Estimated Flow Rate at 5.5 W

|  | In | | | Out | |
|---|---|---|---|---|---|
|  | $CH_3OH$ | $HNO_3$ | $H_2O_2$ | NO | $CO_2$ |
| For 5.5 W mL/min | 0.14 | 1.81 | 0.20 | 88.14 | 43.46 |

These estimated flow rates are exemplary.

In another embodiment, and assuming that the fuel cell system operates as a 28 watt-hour system, and operates for 1 hour with (1) an anolyte flow stream that consists essentially of a 10M $CH_3OH$/4M $H_2SO_4$ solution (1:1 molar ratio of $CH_3OH$:$H_2O$), (2) a catholyte flow stream that consists essentially of a 10M $HNO_3$/4M $H_2SO_4$ solution, and (3) a hydrogen peroxide flow stream that consists essentially of a 70% by weight solution of $H_2O_2$, then the mass balance may be set forth below in Table 2.

TABLE 2

Mass Balance of 28 Whr system operating for 1 hr.

| Constituent | Initial Volume (mL) | Final Volume (mL) |
|---|---|---|
| $CH_3OH$ | 20 | 0 |
| $H_2SO_4$ (4M) | 11 | 11 |
| $H_2O$ (anode) | 19 | 10 |
| $CO_2$ | 0 | 22 g |
| Total Anolyte | 50 mL | 22 mL + 12 L gas |
| $HNO_3$ | 10 | 10 |
| $H_2O_2$ | 37.5 | 0 |
| $H_2O$ (from $H_2O_2$) | 22.5 | 4105 |
| $H_2SO_4$ (4M) | 5.5 | 505 |
| $H_2O$ (cathode) | 9.5 | 28 |
| NO | 0 | 0 |
| Total Catholyte | 85 | 85 |

Thus, and in view of the foregoing and with reference to FIG. 1, the present invention in one embodiment is directed to a recirculating nitric acid regeneration fuel cell system 110 that uses a hydrogen peroxide secondary oxidant to regenerate a nitric acid primary oxidant. In this embodiment, the nitric acid regeneration fuel cell system 110 comprises an anode 112 and a cathode 114 that is confronting and spaced apart from the anode 112. The anode 112 and cathode 114 define an electrode pair assembly 113 that is ionically connected together via an interposing electrolyte (not shown), as well as to an external load (not shown) that completes the circuit. The interposing electrolyte may be a polymer membrane and/or a liquid electrolyte such as, for example, the adjacently flowing electrolytic flow streams that are disclosed in commonly owned U.S. Application No. 2004/0058217 A1, which publication is incorporated herein by reference.

As shown, an anolyte flow stream 116 is configured to flowingly contact the anode 112, wherein the anolyte flow stream 116 includes a fuel such as, for example, methanol (or other suitable hydrocarbon such as, for example, formic acid, propanol, ethanol, and the like), for reacting at the anode 112 to thereby yield anode reaction products that primarily include unreacted fuel, water, and carbon dioxide in an anolyte effluent flow stream 144. A catholyte flow stream 118 is similarly configured to flowingly contact the cathode 114, wherein the catholyte flow stream 118 includes nitric acid as the primary oxidant for reacting at the cathode 114 to thereby yield cathode reaction products that primarily include nitrogen oxide, such as nitric oxide, unreacted nitric acid, and water in a catholyte effluent flow stream 120. The nitric acid regeneration fuel cell system 110 further includes a hydrogen peroxide flow stream 122 that is configured to contact and react hydrogen peroxide with the nitric oxide of the catholyte effluent flow stream 120 at a hydrogen peroxide oxidation zone 124 to thereby yield a regenerated nitric acid flow stream 126. The regenerated nitric acid flow stream 126 may then preferably be reused in or as the catholyte flow stream 118.

As noted above and in some preferred embodiments, the anolyte flow stream comprises a suitable fuel such as, for example, methanol (or other suitable hydrocarbon such as, for example, formic acid, propanol, ethanol, and the like), whereas the catholyte flow stream comprises nitric acid as the primary oxidant. In addition, and in the context of fuel cell systems that utilize "flow-through" or "flow-by" electrode pair assemblies in conjunction with adjacently flowing electrolytic flow streams, an appropriately selected electrolyte is used in the anolyte and catholyte flow streams. The electrolyte used preferably is an acid selected from phosphoric acid, sulfuric acid, trifluoromethane sulfonic acid (triflic acid), difluoromethane diphosphoric acid, difluoromethane disulfonic acid, trifluoroacetic acid, or a combination thereof. In some embodiments, the anolyte flow stream is an approximate 4M MeOH/4M $H_2SO_4$ liquid fuel/electrolyte mixture, and the catholyte flow stream is an approximate 2M $HNO_3$/4M $H_2SO_4$ liquid oxidant/electrolyte flow stream. The molarities of the different chemical constituents associated with the anolyte and catholyte flow streams, may however, vary substantially from these exemplary values. For example, in the anolyte flow stream the concentration of the methanol may range from about 1-5 M and the sulfuric acid may range from about 1-6 M. In the catholyte flow stream the concentration of nitric acid may range from about 0.5-18 M and the sulfuric acid may range from about 1-6 M. In other embodiments, the selected electrolyte is contained in a separate tank or reservoir (not shown) and fed into the anolyte and catholyte flow streams 116, 118, respectively, prior to contacting with the anode 112 and cathode 114, respectively.

As further shown in FIG. 1, the nitric acid regeneration fuel cell system 110 of the present invention may further comprise four discrete holding tanks or reservoirs for containing (1) the fuel (e.g., methanol) anolyte feed solution, (2) the nitric acid primary oxidant catholyte feed solution, (3) the hydrogen peroxide secondary oxidant feed solution, and (4) the carbon dioxide gas reaction product. More specifically, the nitric acid regeneration fuel cell system 110 may further comprise a catholyte recirculation reservoir 128 for containing the nitric acid primary oxidant (initial supply and regenerated nitric acid recirculated back from the cathode 114), wherein the catholyte recirculation reservoir 128 includes a first inlet port 130 and a first outlet port 132. As shown, the first inlet port 130 is fluidicly connected to a regenerated nitric acid flow stream 126 that exits the hydrogen peroxide oxidation zone 124, and the first outlet port 132 is fluidicly connected to the catholyte flow stream 118 that feeds the cathode 114. As is appreciated by those skilled in the art, an appropriately sized catholyte flow stream pump (not shown) may be used to transport the nitric acid primary oxidant from the catholyte recirculation reservoir 128 to the cathode 114, and also the catholyte effluent flow stream 120 to the hydrogen peroxide oxidation zone 124.

The nitric acid regeneration fuel cell system 110 may also further comprise an anolyte recirculation reservoir 134 for containing the fuel (initial supply and unreacted fuel recirculated back from the anode 112), wherein the anolyte recirculation reservoir 134 includes a second inlet port 136 and a second outlet port 138. As shown, the second inlet port 136 is fluidicly connected to a degassed anolyte effluent flow stream 140 (i.e., carbon dioxide has been substantially removed) and the second outlet port 138 is fluidicly connected to the anolyte flow stream 116 that feeds the anode 112. Because the fuel for reacting at the anode 112 yields anode reaction products that primarily include water, unreacted fuel, and carbon dioxide in an anolyte effluent flow stream 144 that exits the anode 112, the nitric acid regeneration fuel cell system 110 preferably further comprises a gas separation zone 142 configured to separate the anolyte effluent flow stream 144 into a carbon dioxide flow stream 146 (that primarily includes the separated carbon dioxide) and the degassed anolyte effluent flow stream 140 (that primarily includes water, unreacted fuel and electrolyte).

In this regard, the gas separation zone 142 is configured as a "T" shaped junction (not shown) in which the anolyte effluent flow stream 144 enters into, and in which the degassed anolyte effluent flow stream 140 and the carbon dioxide flow stream 146 exit from. The "T" shaped junction includes opposing hydrophilic and hydrophobic membranes placed across opposing channels that enable the separation process. More specifically, one side or channel of the "T" shaped junction has a transverse hydrophobic membrane that allows carbon dioxide to pass through, but not the water and unreacted fuel, thereby defining the carbon dioxide flow stream 146. Similarly, the other side or channel of the "T" shaped junction has a transverse hydrophilic membrane that allows the water and unreacted fuel to pass through, but not carbon dioxide, thereby defining the degassed anolyte effluent flow stream 140. The hydrophobic membrane is preferably a polyester or a polyvinylidene fluoride (PVDF), whereas the hydrophilic membrane is preferably TEFLON (with 0.5 μm sized pores and 85% porosity). As is appreciated by those skilled in the art, an appropriately sized anolyte flow stream pump (not shown) is preferably used to transport the fuel from the anolyte recirculation reservoir 134 to the anode 112, as well as the degassed anolyte effluent flow stream 140 back to the anolyte recirculation reservoir 134 (and a carbon dioxide flow stream 146 from the gas separation zone 142 to the carbon dioxide storage reservoir 148—see below).

The nitric acid regeneration fuel cell system 110 may also further comprise a carbon dioxide storage reservoir 148 for storing the carbon dioxide of the carbon dioxide flow stream 146, wherein the carbon dioxide storage reservoir 148 includes a third inlet port 150. As shown, the third inlet port 150 is fluidicly connected to the carbon dioxide flow stream 146. The carbon dioxide storage reservoir 148 preferably contains an absorbent material such as, for example, granules of soda lime, for absorbing the carbon dioxide. As is appreciated by those skilled in the art, soda lime is simply a mixture of sodium and calcium hydroxides. The absorbent material may, however, consist of a perfluorocarbon fluid such as, for example, perfluorooctylbromide (PFOB); alternatively, the absorbent material may be one or more of BaOH, MgOH, $Mg(OH)_2$, MgO, CaOH, $Ca(OH)_2$, LiOH, and lithium silicates like metasilicate or orthosilicate. As noted above, the anolyte flow stream pump (not shown) may also be used to transport the carbon dioxide flow stream 146 from the gas separation zone 142 to the carbon dioxide storage reservoir 148. In certain alternative embodiments, the carbon dioxide storage reservoir 148 is omitted and the carbon dioxide flow stream 146 is simply vented to the atmosphere.

The nitric acid regeneration fuel cell system 110 may also further comprise a hydrogen peroxide storage reservoir 152 for storing the hydrogen peroxide (preferably a solution of about 50 to about 70 percent by weight of hydrogen peroxide, and also containing one or more stabilizers such as, for example, colloidal stannate, sodium pyrophosphate, and also organophosphonates) that supplies the hydrogen peroxide flow stream 122, wherein the hydrogen peroxide storage reservoir 152 includes a third outlet port 154. As shown, the third outlet port 154 is fluidicly connected to the regenerated nitric acid flow stream 126 via the hydrogen peroxide oxidation zone 124. In operation, the hydrogen peroxide flow stream 122 is merged with the catholyte effluent flow stream 120 at the hydrogen peroxide oxidation zone 124 to thereby yield the regenerated nitric acid flow stream 126. In other words and in this manner, hydrogen peroxide is able to contact and react with nitric oxide so as to regenerate nitric acid. It is specifically contemplated that in certain alternative embodiments, the hydrogen peroxide flow stream may be replaced with an air flow stream, thereby allowing oxygen from the air to contact and react with nitric oxide so as to regenerate nitric acid. As is appreciated by those skilled in the art, an appropriately sized hydrogen peroxide pump (not shown) is preferably used to transport hydrogen peroxide associated with the hydrogen peroxide flow stream 122 from the hydrogen peroxide reservoir 152 to the hydrogen peroxide oxidation zone 124, and also the regenerated nitric acid flow stream 126 back to the catholyte recirculation reservoir 128.

Because of the highly corrosive and reactive nature of the chemicals involved with the nitric acid regeneration fuel cell systems disclosed herein, the various electrode structures of the present invention are preferably made or derived from a silicon substrate (e.g., a n- or p-type silicon wafer) using microelectromechanical systems (MEMS) technologies such as, for example, wet chemical etching, deep reactive ion etching (DRIE), and hydrofluoric acid (HF) anodic etching as known in the art and as herein disclosed. The electrode structures of the present invention may, however, be made from one or more other materials such as, for example, a porous carbon-based material, a porous ceramic material, a porous indium-phosphide material, and/or a sol-gel material (see, e.g., commonly owned PCT International Nos. WO 01/37357, WO 02/086994, WO 03/05873, and U.S. Patent Publication Nos. US2002/0182479, US2003/0194598 which publications are incorporated herein by reference in their entireties).

In certain preferred embodiments of the present invention, the electrode pair assemblies are based, in large part, on porous flow-through substrates and support structures that have catalyst particles dispersed (contiguously or noncontiguously) on selected pore surfaces. In these embodiments, the surfaced adhered catalyst material is generally readily accessible to flowing gaseous and/or liquid reactant streams. Moreover, and in the context of some embodiments of the present invention, it has been discovered that silicon-based substrates and/or support structures are particularly useful as electrodes for fuel cell systems (especially for microfluidic direct methanol fuel cell systems), in part because such substrates and/or support structures are able to provide a high surface area to bulk volume ratio, have good mechanical strength, and are compatible with thin/thick films which are often needed for making selected electrical connections. Because of these physical characteristic, among others, and because silicon-based substrates and/or support structures are amenable to micro-fabrication techniques, the electrochemical and fuel cells of the present invention may be manufactured within a small form factor, but with sufficient power densities to power portable electronic devices.

Accordingly, and without limitation to any particular methodology, the silicon-based electrode pair assemblies and related flow channels and flow cells of certain preferred embodiments may be manufactured by using standard microelectromechanical systems (MEMS) technologies such as, for example, wet chemical etching, deep reactive ion etching (DRIE), hydrofluoric acid (HF) anodic etching, alkaline etching, plasma etching, lithography, and electrodeposition. By using these techniques, a silicon substrate useful for carrying a catalyst may be produced, wherein the silicon substrate may have any number of pores and pores sizes such as, for example, random or ordered pore arrays—including pore arrays having selected pore diameters, depths, and distances relative to one another. In short, the present invention is inclusive of all silicon substrate support structures, including combinations thereof, that have any number of possible porosities and/or void spaces associated therewith.

Thus, the electrode structures of certain preferred embodiments of the present invention generally comprise a silicon substrate (with a thickness preferably ranging from about 50 to about 500 microns, and more preferably from about 300 to about 500 microns) having one or more discrete porous regions disposed across a top surface of the substrate. In addition, each of the one or more discrete porous regions is preferably defined by a plurality of acicular or columnar pores (i.e., passageways) that extend through the substrate (with average diameter ranging from about 0.5 to about 10 microns). The plurality of acicular or columnar pores defines inner pore surfaces, and the inner pore surfaces may have an optional conformal electrically conductive layer thereon. In some embodiments, the pores are substantially perpendicular to the top and bottom surfaces of the substrate. In some other embodiments, the pores each have a diameter of about 5 microns and are spaced apart from one another about 8 microns (from pore center axis to adjacent pore center axis) so as to yield substrate having an approximate 30% porosity.

Porous silicon substrates (and/or support structures) useful as electrode structures may be formed by silicon micro-machining and/or wet chemical techniques (employed by the semiconductor industry) such as, for example, anodic polarization of silicon in hydrofluoric acid. As is appreciated by those skilled in the art, the anodic polarization of silicon in hydrofluoric acid (HF) is a chemical dissolution technique and is generally referred to as HF anodic etching. This technique has been used in the semiconductor industry for wafer thinning, polishing, and the manufacture of thick porous silicon films. In the context of certain preferred embodiments of the present invention, it is to be understood that the porous silicon may be microporous silicon (i.e., average pore size <2 nm), mesoporous silicon (i.e., average pore size of 2 nm to 50 nm), or macroporous silicon (i.e., average pore size >50 nm). The pores are preferably arranged as a series of parallelly aligned acicular or columnar pores that extend into or through the silicon substrate. Although the pores may be angled with respect to top and bottom surfaces of the silicon substrate, they are preferably substantially perpendicular to the top and bottom surfaces of the substrate.

For example, porous silicon substrates may be formed by a photoelectrochemical HF anodic etching technique, wherein selected oxidation-dissolution of silicon occurs under a controlled current density. An advantage of this relatively more sophisticated technique over others is that it is largely independent of the different principal crystallographic planes associated with single-crystal silicon wafers (whereas most anisotropic wet chemical etching methods have very significant differences in rates of etching along the different principal crystallographic planes).

Figure 2A:
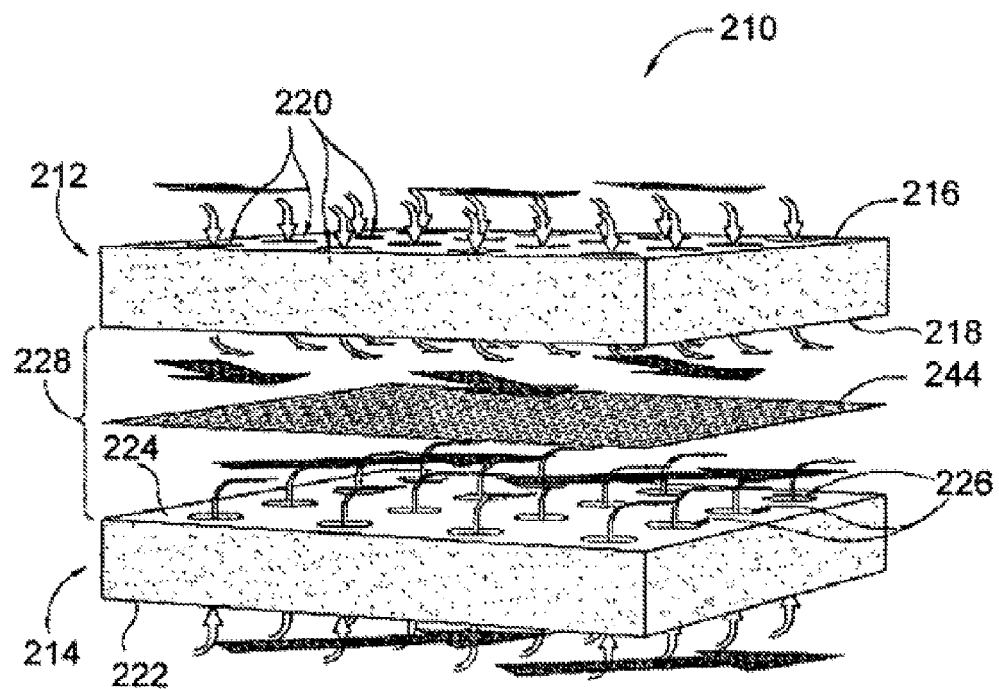
FIG. 2A illustrates an exploded side pictorial view of a portion of a fuel cell in accordance with an embodiment of the present invention, wherein the fuel cell comprises a first flow-through electrode; a second flow-through electrode spaced apart from the first flow-through electrode; a plenum interposed between and contiguous with at least a portion of the first and second flow-through electrodes; a first fluid that passes through the first flow-through electrode and into the plenum, wherein the first fluid laminarly flows adjacent to the first electrode in a first flow direction; and a second fluid that passes through the second flow-through electrode and into the plenum, wherein second fluid laminarly flows adjacent to the second electrode in a second flow direction, and wherein the first and second flow directions are different from each other.
Figure 2B:
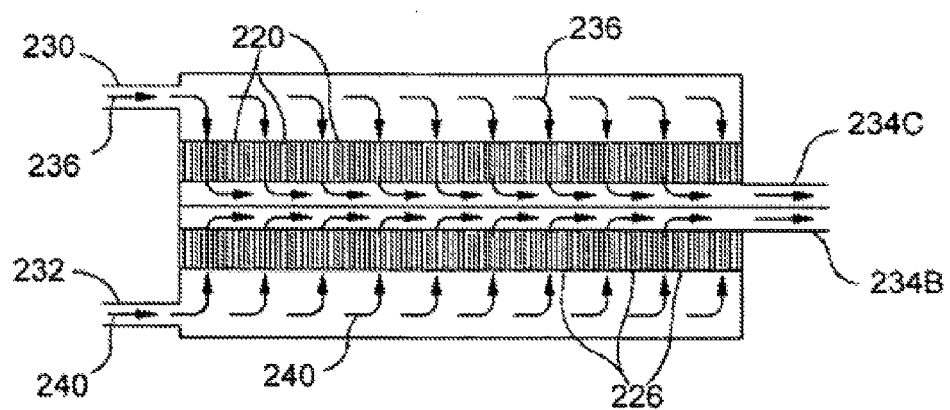
FIG. 2B illustrates a side view of the portion of the fuel cell depicted in FIG. 2A.

In view of the foregoing and with reference to FIGS. 2A-2B, the nitric acid regeneration fuel cell system of the present invention is in some embodiments configured such that the anode defines a first flow-through electrode (preferably composed of silicon), and the cathode defines a second flow-through electrode (also preferably composed of silicon). In these embodiments, the first flow-through electrode 212 has an outer side 216 and an inner side 218 with a plurality passageways 220 (e.g., acicular pores) extending from the outer side 216 to the inner side 218. The second flow-through electrode 214 also has an outer side 222 and an inner side 224 also with a plurality of passageways 226 (e.g., acicular pores) extending from the outer side 222 to the inner side 224. As shown, the second flow-through electrode 214 is spaced apart from the first flow-through electrode 212 such that the inner sides 218, 224 of each flow-through electrode 212, 214 are confronting each other. In addition, a plenum 228 (also sometimes referred to as a "flow cell") is interposed between, and contiguous with, at least a portion of the inner sides 218, 224 of each flow-through electrode 212, 214.

As best shown in FIG. 2B, an anolyte flow stream inlet zone 230 outwardly bounds the outer side 216 of the first flow-through electrode 212, and a catholyte flow stream inlet zone 232 outwardly bounds the outer side 222 of the second flow-through electrode 214. In addition, an anolyte effluent flow stream outlet zone 234C and a catholyte outlet zone 234B outwardly bound a portion of the inner sides 218, 224 of each flow-through electrode 212, 214. In this configuration, an anolyte flow stream 236 enters the anolyte flow stream inlet zone 230 and passes through the plurality of passageways 220 of the first flow-through electrode 212 and flows laminarly adjacent to the inner side 218 of the first flow-through electrode 212 (in a first average flow direction) and exits through the anolyte effluent flow stream outlet zone 234C. Similarly, a catholyte flow stream 240 enters the catholyte flow stream inlet zone 232 and passes through the plurality of passageways 226 of the second flow-through electrode 214 and flows laminarly adjacent to the inner side 224 of the second flow-through electrode 214 (in a second average flow direction) and exits through the catholyte effluent flow stream outlet zone 234B. The first and second average flow directions are preferably different from each other; however, they may be the same.

Stated somewhat differently, the anolyte flow stream 236 is flowing and flows through the passageways 220 (e.g., acicular pores) of the first flow-through electrode 212 (and in so doing the reactant (e.g., methanol) is able to react on, for example, surface adhered platinum:ruthenium ($Pt_x$:$Ru_y$) catalyst particles that line the pore surfaces) and adjacent to the first flow-through electrode 212 within the plenum 228. Similarly, the catholyte flow stream 240 is flowing and flows through the passageways 226 (e.g., acicular pores) of the second flow-through electrode 214 (and in so doing the nitric acid primary oxidant) is able to react on, for example, surface adhered platinum (Pt) catalyst particles that line the pore surfaces) and adjacent to the second flow-through electrode 214 within the plenum 228. As shown, the anolyte flow stream 236 and the catholyte flow stream 240 flow adjacent and cross-directional with respect to each other within the plenum 228 and exit at the outlet zones 234B, 234C. The anolyte flow stream 236 and the catholyte flow stream 240 both generally flow laminarly. In this way, the two liquid laminar flow streams 236, 240 are allowed to diffusively contact each other at a fluid interface 244 within the plenum 228 thereby allowing for $H^+$ ions to diffuse from the anode-side catalyst particle reaction sites to cathode-side catalyst particle reaction sites. The fluid interface 244 may, however, be replaced with a structural separator component. The separator may be a fibrous glass membrane, a metallic membrane such as, for example, a palladium foil, or a polymeric membrane such as, for example, NAFION; provided, however, that the separator is substantially permeable to $H^+$ ions.

For purposes of illustration and not limitation, the following examples more specifically disclose various aspects of the present invention.

EXAMPLE 1

Performance of Porous Silicon-Based Cathode Reacting with Nitric Acid Flow Stream An investigation was conducted to determine the performance characteristics associated with a cathode half-cell made from a porous silicon-based substrate. For our investigation, a single 2 cm by 2 cm square coupon electrode having a 0.89 cm by 0.89 cm active porous hydrodynamic flow-through region was made by HF anodic etching of a silicon wafer etching. In this regard, an n-type silicon wafer having a resistively of 23-27 Ω-cm, a (100) crystal orientation, and a thickness of 525 μm was initially masked and etched with KOH to form an ordered array of etched pits (each pit of about 5 μm in diameter). The silicon substrate was then etched with 4 wt % HF—$H_2O$ solution with an additional 1 vol % (of the HF solution) surfactant (NCW-1001, Wako Chemicals, Inc., USA) at a current density of about 10 mA/$cm^2$ at 14° C. A potential of 1.4 V (min) to 6 V (max) was applied with backside illumination at 880 nm. The silicon substrate was etched for about 15 hours. The resulting acicular or columnar pores were perpendicular into the wafer with an average depth of 400 about microns. The backside of the sample was ground with a polisher to create the porous hydrodynamic flow-through region (having about 39% porosity). The silicon substrate was then doped with a solid-source (Techneglas PhosPlus) in combination with a spin on (Honeywell P-8545) and then coated with a 1 micron thick Au film via evaporation.

The resulting substrate or sample coupon (i.e., Sample No. U0005-15-E) had a measured conductivity of 0.34Ω and an average pore diameter of about 3.79 μm (with the largest pore size of about 7.151 μm). A platinum catalyst was deposited on the pore surfaces (of the active porous hydrodynamic flow-through window region) by electroplating. More specifically, a solution containing 20 mM $H_2PtCl_6$.$xH_2O$ acid, 25% $CH_3CH_2OH$, and 1M $H_2SO_4$ was flowed through the hydrodynamic flow-through channels of the coupon at a rate of 156.3 μL/min/$cm^2$. The coupon was then plated galvanostatically using a current of 20 mA/$cm^2$ for 80 min. The total plating charge was 96.7 Coulombs. The catalyzed coupon was then tested as a cathode half-cell at 60° C. (+/−4° C.) by flowing varied $HNO_3$ flow streams through the coupon. Ag/AgCl was used as the reference electrode.

Figure 3A:
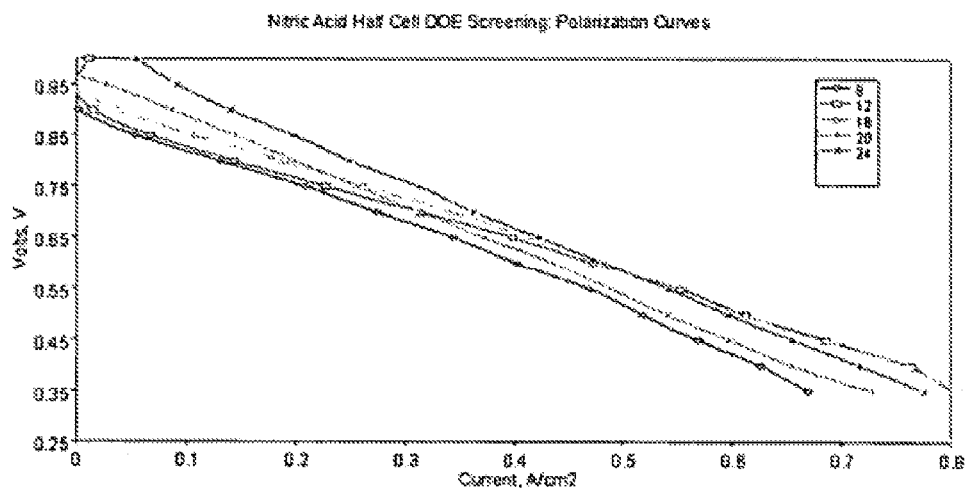
FIG. 3A shows the performance (polarization) characteristics associated with a cathode half-cell made from a porous silicon-based substrate in accordance the embodiment (of the present invention) set forth in Example 1. In this figure, current density in $A/cm^2$ (abscissa) versus voltage in V (ordinate) has been plotted as best fit polarization curves for 8M, 12M, 16M, 20M, and 24M $HNO_3$ flow streams, wherein each flow stream has a constant flow rate of 125 µL/min.
Figure 3B:
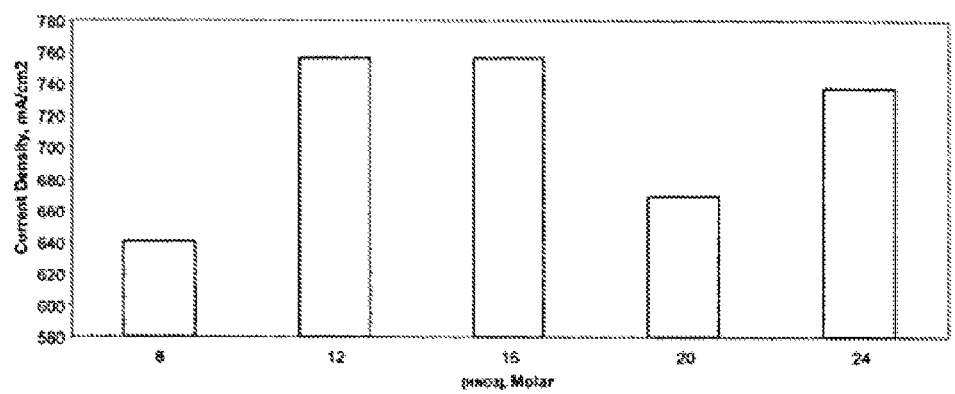
FIG. 3B shows the performance (constant voltage) characteristics associated with a cathode half-cell made from a porous silicon-based substrate in accordance the embodiment (of the present invention) set forth in Example 1. In this figure, molarity (abscissa) versus current density in $mA/cm^2$ (ordinate) has been plotted as a bar graph for 8M, 12M, 16M, 20M, and 24M $HNO_3$ flow streams, wherein each flow stream has a constant flow rate of 125 µL/min.
Figure 3C:
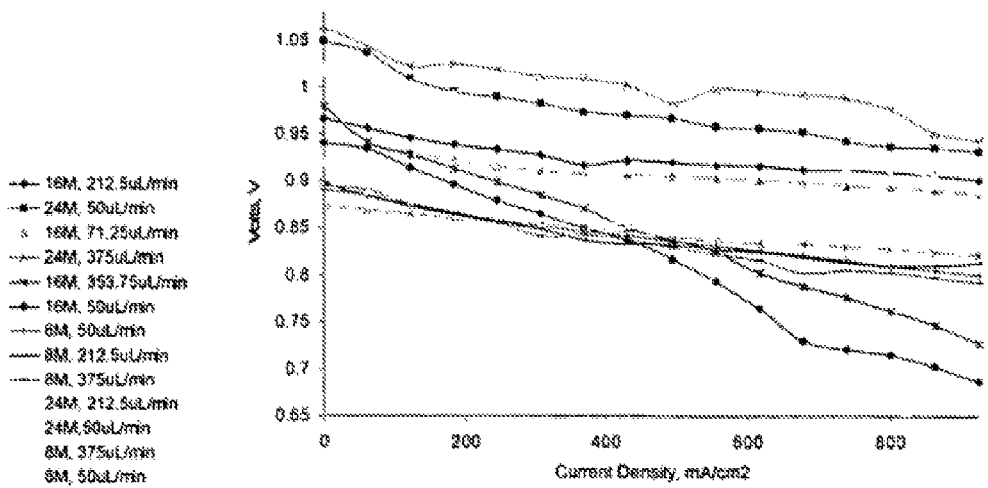
FIG. 3C shows the performance (constant voltage) characteristics associated with a cathode half-cell made from a porous silicon-based substrate in accordance with the embodiment (of the present invention) set forth in Example 1. In this figure, current density in $mA/cm^2$ (abscissa) versus voltage in V (ordinate) has been plotted as best fit polarization curves for 13 different $HNO_3$ flow streams, namely, (1) a 16M 212.5 µL/min. $HNO_3$ flow stream, (2) a 24M 50 µL/min. $HNO_3$ flow stream, (3) a 16M 71.25 µL/min. $HNO_3$ flow stream, (4) a 24M 375 µL/min. $HNO_3$ flow stream, (5) a 16M 353.75 µL/min. $HNO_3$ flow stream, (6) a 16M 50 µL/min. $HNO_3$ flow stream, (7) a 16M 50 µL/min. $HNO_3$ flow stream, (8) a 8M 50 µL/min. $HNO_3$ flow stream, (9) a 8M 375 µL/min. $HNO_3$ flow stream, (10) a 24M 212.5 µL/min. $HNO_3$ flow stream, (11) a 24M 50 µL/min. $HNO_3$ flow stream, (12) a 8M 375 µL/min. $HNO_3$ flow stream, and (13) a 8M 50 µL/min. $HNO_3$ flow stream.

To determine the performance characteristics of the cathode half-cell, an experimental design was developed wherein the concentration of the $HNO_3$ flow stream (i.e., catholyte flow stream) through the coupon was varied from 8 to 24M $HNO_3$ and the flux was varied from 62.5 to 468.8 μL/min/$cm^2$. After an open circuit potential (OCV) was measured for 5 min., the polarization of the cathode was recorded galvanostatically by changing the current from 0 to −750 mA in 50 mA/30 sec increments. An initial screening suggested the further testing at fixed $HNO_3$ flow stream flow rate of 125 μL/min. The results of this testing have been plotted and are shown in FIGS. 3A and 3B, respectively. The results of further testing in which the flow rate and molarity of the $HNO_3$ flow stream were varied are shown in FIG. 3C.

EXAMPLE 2

Regeneration with a Hydrogen Peroxide Flow Stream

A further investigation was conducted in order to demonstrate the feasibility of regenerating catholyte effluent flow streams produced in a manner similar to those of Example 1. More specifically, various concentrated hydrogen peroxide flow streams were mixed together with various catholyte effluent flow streams via small tubing at a reaction zone and it was repeatedly demonstrated that an approximate 78% conversion rate of NO back to $HNO_3$ could be achieved.

In some embodiments, the present fuel cell systems comprise novel electrode pair assemblies where the liquid anolyte flow stream (having an acidic electrolyte component) functions as the interposing electrolyte. In this configuration, protons liberated at the anode are able to migrate through the interposing flowing liquid anolyte flow stream (contained within a central plenum) and combine with oxidant at the opposing cathode to yield reaction products.

Figure 4B:
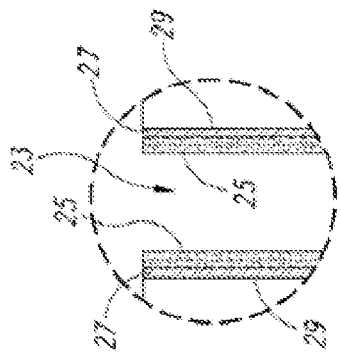
FIG. 4B shows an enlarged view of a circled portion of the porous flow-through anode of FIG. 4A, wherein the circled portion illustrates a single pore having a first selected catalyst layer positioned on an interposing first selected conductive layer that, in turn, is positioned on the anode pore wall.
Figure 4C:
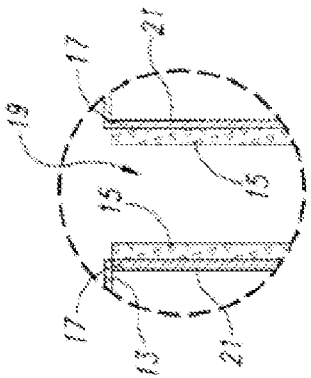
FIG. 4C shows an enlarged view of a circled portion of the porous flow-by cathode of FIG. 4A, wherein the circled portion illustrates a single pore having a second selected catalyst layer positioned on a first substrate and on an interposing second selected conductive layer that, in turn, is positioned on the cathode pore wall.
Figure 4A:
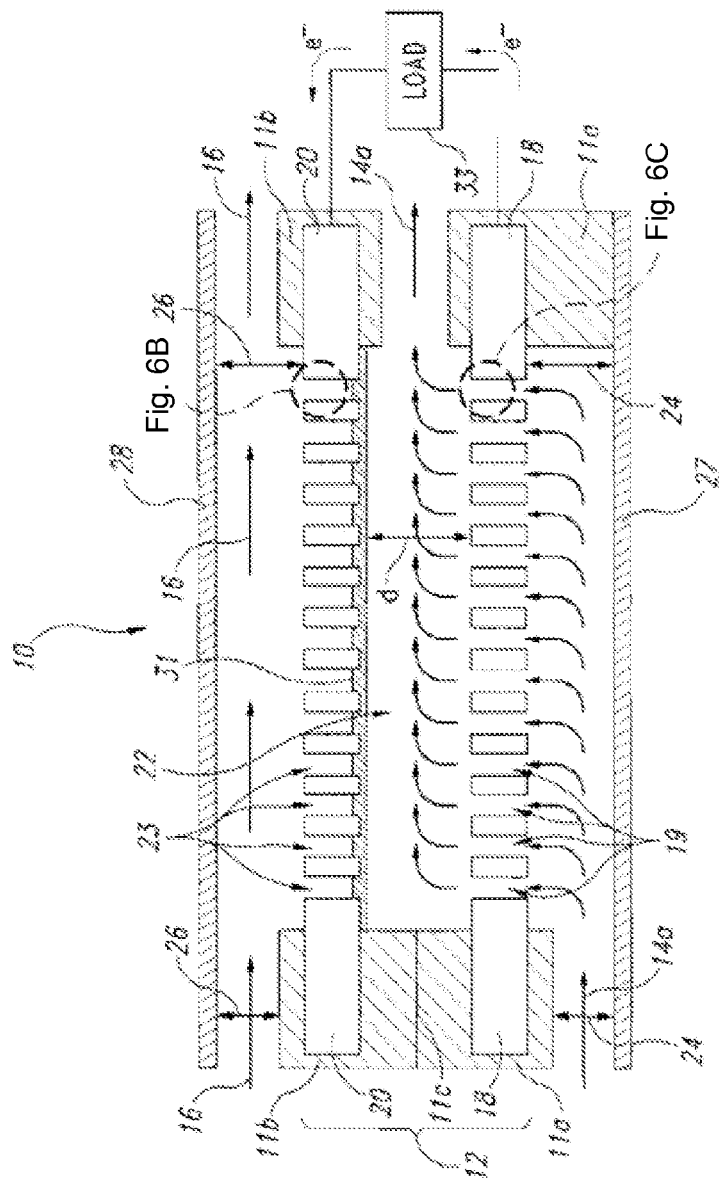
FIG. 4A depicts a side cross sectional view of an electrode pair assembly in accordance with an embodiment of the present invention. As shown, a liquid anolyte flow stream is configured to flowingly contact and substantially pass through a porous flow-through anode and into a central plenum, whereas a liquid catholyte flow stream is configured to flowingly contact and pass adjacent to a porous flow-by cathode such that a portion of the catholyte flow stream reacts at the cathode but does not substantially pass through the cathode and into the central plenum.

FIGS. 4A-4C show a methanol-nitric acid fuel cell system 10 that includes an electrode pair assembly 12, not having an interposing solid polymer proton exchange membrane, configured to receive and react with a liquid methanol anolyte flow stream 14A, 14B and a liquid nitric acid catholyte flow stream 16. As shown, the anolyte flow stream 14A is flowing in a shown direction, but can also be flowing in an opposite direction. Thus, the fuel cell electrode pair assembly 12 of the present invention includes a porous flow-through anode 18, a porous flow-by cathode 20 confronting and spaced apart from the anode 18 (generally a distance d that is between about 250 μm to about 1 mm), and a central plenum 22 that is interposed between and connected to the anode 18 and the cathode 20. The anode 18 and the cathode 20 are each generally encased within respective non-conductive housings 11a, 11b that, in turn, are bonded or welded together at their interface 11c to form the electrode pair assembly 12. The non-conductive housings 11a, 11b may be formed of plastic such as, for example, a polycarbonate or a polyvinylidene (PVDF), or a glass material. In addition, the non-conductive housings 11a, 11b may be bonded together with a suitable adhesive or a welded together with a laser.

As further shown, the porous flow-through anode 18 (generally having a uniform thickness ranging from about 100 μm to about 500 μm) includes a plurality of spaced apart flow-through anode pores 19 each having a first selected catalyst layer 15 (shown in FIG. 4C) positioned on an interposing first selected conductive layer 17. The flow-through anode pores 19 extend through the flow-through anode 18 and may be regularly spaced apart from one another a distance ranging from about 3 μm to about 20 μm. Accordingly, the flow-through anode pores 19 generally have aspect ratios of greater than about 10:1. The first selected conductive layer 17 generally has a uniform thickness ranging from about 50 Å about 2,500 Å and is positioned on the anode pore walls 21, as well as on the inner surface 13 and outer surface (not shown) of the anode 18. The first selected catalyst layer 15 preferably comprises a plurality of surface adhered platinum:ruthenium ($Pt_x$: $Pt_y$) particles, whereas the first selected conductive layer 17 preferably comprises a conductive metallic material such as, for example, gold, ruthenium, or nickel silicide and is generally conformal (i.e., uniform step-wise coverage) to the underlying surface defined by the anode pore walls 21. The first selected conductive layer 17 functions, in part, as a current collector for the flow-through anode 18. An optional seed layer (not shown) of, for example TiW/Au, may be interposed between the first conductive layer 17 and the anode pore walls 21 and the inner surface 13 and the outer surface (not shown) of the anode 18.

As further shown, the liquid methanol anolyte flow stream 14A, 14B is configured to flowingly contact and pass through the porous flow-through anode 18 (via the plurality of flow-through pores 19) and into the central plenum 22. A first reactant, namely methanol or other reactive hydrocarbon, contained within the anolyte flow stream 14A, 14B (e.g., methanol in an aqueous electrolyte solution) is thus able to react at the first selected catalyst layer 15 so as to liberate protons ($H^+$) and electrons ($e^-$). The anolyte flow stream 14A, 14B generally has a flow rate ranging from about 0.3 ml/min to about 1.8 ml/min.

Similar to the porous flow-through anode 18, the porous flow-by cathode 20 (also generally having a uniform thickness ranging from about 100 μm to about 500 μm) also includes a plurality of spaced apart cathode pores 23 each having a second catalyst layer 25 positioned on an interposing second selected conductive layer 27 (shown in FIG. 4B). The cathode pores 23 similarly extend through the flow-by cathode 20 and may be regularly spaced apart from one another a distance ranging from about 3 μm to about 20 μm. Accordingly, the cathode pores 23 also generally have aspect ratios of greater than about 10:1. The second selected conductive layer 27 generally has a uniform thickness ranging from about 50 Å to about 2,500 Å and is positioned on the cathode pore walls 29. The second selected catalyst layer 25 preferably comprises a plurality of surface adhered gold, platinum, ruthenium, or palladium particles. Similarly, the second selected conductive layer 27 preferably comprises a conductive metal such as, for example, gold, platinum, ruthenium, or palladium, and is also generally conformal to the underlying surface defined by the cathode pore walls 29 and likewise functions, in part, as a current collector for the cathode 20. The second catalyst layer 25 and the second selected conductive layer 27 are in some embodiments the same material. The otherwise flow-through cathode pores 23 of the cathode 20 are plugged by a catalyzed separation layer 31 adhered to the cathode 20 on the side facing the plenum 22 as shown. The catalyzed separation layer 31 prevents the catholyte flow stream 16 from substantially passing through the flow-by cathode 20 and into the central plenum 22.

In contrast to the liquid methanol anolyte flow stream 14A, 14B, the liquid nitric acid catholyte flow stream 16 is configured to flowingly contact and pass adjacent to the porous flow-by cathode 20 such that a portion of the catholyte flow stream 16 reacts at the cathode 20 but does not substantially pass through the cathode 20 and into the central plenum 22. More specifically, the catalyzed separation layer 31 substantially prevents the catholyte flow stream 16 from passing into the plenum 22 by acting as a physical barrier for fluid transport. In some embodiments, the catalyzed separation layer 31 is a porous interconnected network of catalyst particles embedded within a polymeric binder material. For example, the catalyzed separation layer 31 may be applied (e.g., painted) onto the cathode 20 as a polymer-based ink coating that contains a major amount of platinum nanoparticles.

Because of the presence of the catalyzed separation layer 31 on the cathode 20, a second reactant, namely nitric acid, contained within the catholyte flow stream 16 (e.g., nitric acid in an aqueous electrolyte solution) is able to react at the second selected catalyst layer 25 and accept protons ($H^+$) and electrons ($e^-$) without substantially passing through the cathode 20 and into the central plenum 22. An external load 33 completes the circuit and establishes a pathway for free electrons ($e^-$) to travel from the anode 18 to the cathode 20. The protons ($H^+$) liberated at the porous flow-through anode 18 travel across the liquid methanol anolyte flow stream 14A, 14B contained within the central plenum 22 and migrate through the catalyzed separation layer 31 in order to reach and react at the porous flow-by cathode 20 (namely, at the second selected catalyst layer 25 of the plurality of flow-through cathode pores 23). In alternative embodiments (not shown), the catalyzed separation layer 31 is adhered to the side of the cathode 20 facing the catholyte flow stream 16 so as to plug (partially, substantially, or completely) the plurality of flow-through pores 23.

As further shown, the fuel cell system 10 of the present invention also includes (1) an anolyte flow channel 24 positioned adjacent to the anode 18 and to a first wall 27 (e.g., plastic) for transporting the liquid anolyte flow stream 14A, 14B to the anode 18 by means of an upstream or downstream pump (not shown), and (2) a catholyte flow channel 26 positioned adjacent to the cathode 20 and to a second wall 28 (e.g., plastic) for transporting the liquid catholyte flow stream 16 to the cathode 20 also by means of an upstream or downstream pump (not shown). Unlike conventional direct fuel cell systems that utilize solid polymer proton exchange membranes as the interposing electrolyte (of an electrode pair assembly), the electrode pair assemblies 12 of the different embodiments of the present invention utilize the liquid anolyte flow stream 14A, 14B (having an acidic electrolyte component (e.g., $H_2SO_4$ or triflic acid)) as the interposing electrolyte. In this way, protons ($H^+$) liberated at the anode 18 are able to migrate through the interposing flowing liquid anolyte flow stream 14A, 14B (contained within the central plenum 22) and combine with oxidant at the catalyst layer 25 of the opposing cathode 20 to yield reaction products.

Figure 5:
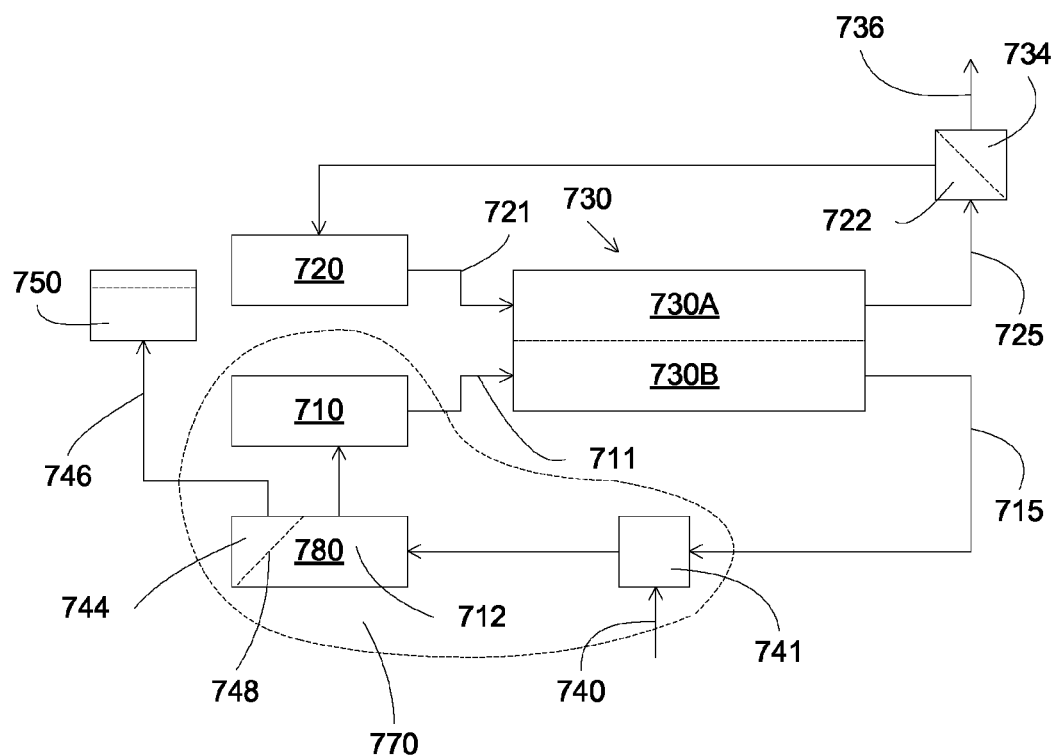
FIG. 5 illustrates an exemplary regeneration fuel cell system according to some embodiments of the present invention.

FIG. 5 illustrates an exemplary regeneration fuel cell system according to some embodiments of the present invention. The regeneration cell system 730 comprises an anode 730A and a cathode 730B that is confronting and spaced apart from the anode 730A. Anolyte flow stream 721 comprising a fuel is supplied to the anode 730A, then reacted at the anode 730A and become an anolyte effluent flow stream 725 that comprises anode reaction products such as unreacted fuel, water, and carbon dioxide. A container or reservoir 720 can be included to contain the fuel anolyte feed solution to be supplied to the anolyte flow stream 721. An optional pumping assembly can also be included to form a close loop of the fuel anolyte flow stream, recirculating the anolyte flow stream from the reservoir 720 to the anolyte flow stream 721 to the anode 730A to the anolyte effluent flow stream 725 and returning to the reservoir 720.

The regeneration fuel cell system 730 can comprise a degassing assembly 734 for degassing the anolyte effluent flow stream 725. A gas separation membrane can separate the liquid component 722 (e.g., the fuel anolyte flow stream) and gaseous component (e.g., the carbon dioxide reaction product) of the anolyte effluent flow stream to release the gaseous component in a gaseous flow stream 736, either vented to the atmosphere or preferably to a storage container for the carbon dioxide gas reaction product.

Catholyte flow stream 711 comprising a primary oxidant, such as nitric acid, is supplied to the cathode 730B, then reacted at the cathode 730B and become a catholyte effluent flow stream 715 that comprises cathode reaction products such as nitrogen oxide (including nitric oxide and nitrous oxide), unreacted nitric acid, and water. A container or reservoir 710 can be included to contain the fuel anolyte feed solution to be supplied to the anolyte flow stream 721. An optional pumping assembly can also be included to form a close loop of the nitric acid primary oxidant catholyte flow stream, recirculating the catholyte flow stream from the reservoir 710 to the catholyte flow stream 711 to the cathode 730B to the catholyte effluent flow stream 715 and returning to the reservoir 710.

The regeneration fuel cell system 730 can further comprise a nitric acid regeneration assembly 741, comprising a secondary oxidant flow stream 740, such as hydrogen peroxide or air, that is configured to react with the nitrogen oxide of the catholyte effluent flow stream 715 (or the catholyte flow stream 711) to regenerate the catholyte effluent flow stream, e.g., converting the nitrogen oxide back to nitric acid. The regenerated nitric acid flow stream can rejoin the catholyte flow stream 711. A fan assembly for providing air or a container or reservoir for providing hydrogen peroxide can be included to be supplied to the secondary oxidant flow stream 740. The secondary oxidant flow stream 740 can join the close loop of the catholyte flow stream, forming a close loop catholyte flow stream with regeneration capability.

In some embodiments, the present invention discloses methods and systems for regenerating a fuel cell, comprising sparging a catholyte effluent flow stream with a gaseous oxygen-containing flow stream to regenerate the catholyte effluent flow stream. For example, a fuel cell can utilize nitric acid in a catholyte flow stream, which then contact and react at a cathode to generate nitrogen oxide, e.g., $NO_x$ or $N_xO_y$, in a catholyte effluent flow stream. A gaseous oxygen-containing flow stream 740 can bubble into the liquid catholyte effluent flow stream 715 or a regeneration assembly 741 coupled to the catholyte effluent flow stream to convert the nitrogen oxide back to liquid nitric acid, effectively regenerating the catholyte effluent flow stream. In some embodiments, the oxygen-containing flow stream comprises an air flow stream, which then reacts with the nitrogen oxide and the water byproducts within the catholyte effluent flow stream to form nitric acid. In some embodiments, an oxygen-containing gaseous source is provided for supplying the oxygen-containing flow stream. For example, the gaseous source can be the air ambient, together with a fan and/or pressure regulator for generating an air flow stream.

In some embodiments, the present invention discloses methods and systems for regenerating and/or operating a fuel cell, comprising collecting gaseous byproducts from the catholyte effluent flow stream and then converting the gaseous byproducts to liquid forms for easy disposal. A waste collector assembly 780 can be coupled to the catholyte effluent flow stream 715 to collect gaseous components 744, e.g., the nitrogen oxide within the catholyte effluent flow stream, while routing the liquid catholyte 712 back to the cathode 730B, such as through the catholyte reservoir 710 to join the catholyte flow stream 711.

The waste collector assembly can comprise a membrane 748, allowing gaseous elements to pass through while stopping liquid elements, thus can collect gaseous byproducts 744 while not affecting the catholyte effluent flow stream 712. The liquid catholyte is routed to the reservoir 710 to complete the close loop recirculation of the primary oxidant flow stream. The gaseous byproducts 744 can be collected and routed 746 to a waste disposal container, for example, containing a liquid oxidant such as hydrogen peroxide 750 and water, to react and convert the gaseous byproducts, e.g., nitrogen oxide, to waste in liquid form, e.g., nitric acid. The liquid waste can be much easier to be disposed, as compared to the gaseous waste.

In some embodiments, the membrane 748 can comprise opposing hydrophilic and hydrophobic membranes placed across opposing channels that enable the separation process. For example, one side of the membrane 748 can have a transverse hydrophobic membrane that allows gaseous elements to pass through, but not liquid elements. Similarly, the other side of the membrane 748 can have a transverse hydrophilic membrane that allows liquid elements to pass through while blocking gaseous elements.

In some embodiments, the present invention discloses methods and systems for regeneration and waste disposal of a fuel cell. An exemplary assembly 770 comprises an oxygen-containing regeneration flow stream 740 (such as air flow) sparging the catholyte effluent flow stream 715 to generate the nitrogen oxide back to nitric acid to return to the catholyte reservoir 710. The assembly 770 can also comprise a gaseous separation assembly 780 for collecting gaseous components, such as nitrogen oxide remaining in the catholyte effluent flow stream after regeneration. Waste collector 750 can be included to convert the gaseous component 744 to liquid form for ease of disposal.

Different configurations for the regeneration and waste disposal assembly 770 can be used, for example, sparging the regeneration flow stream at the catholyte effluent flow stream 741, at the waste collector 780, or at the catholyte reservoir 710. The separation of gaseous and liquid components in the catholyte effluent flow stream can be provided at the catholyte effluent flow stream 780 or at the catholyte reservoir 710.

Figure 6A:
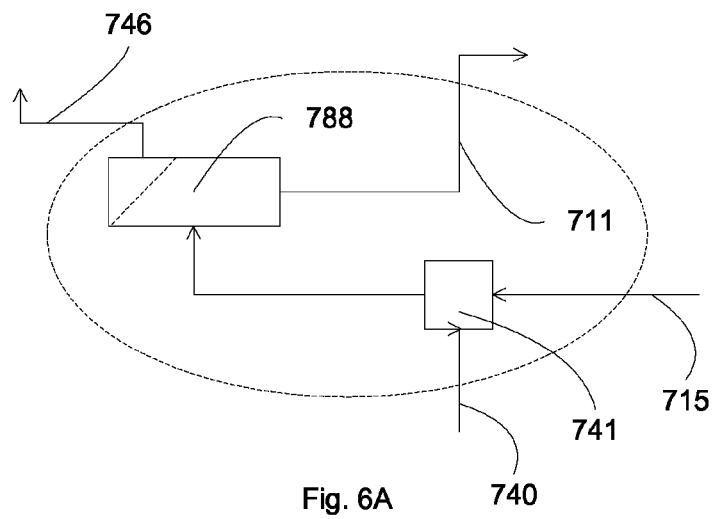
FIGS. 6A-6C illustrate exemplary alternative configurations for the regeneration and waste collection according to some embodiments of the present invention.
Figure 6B:
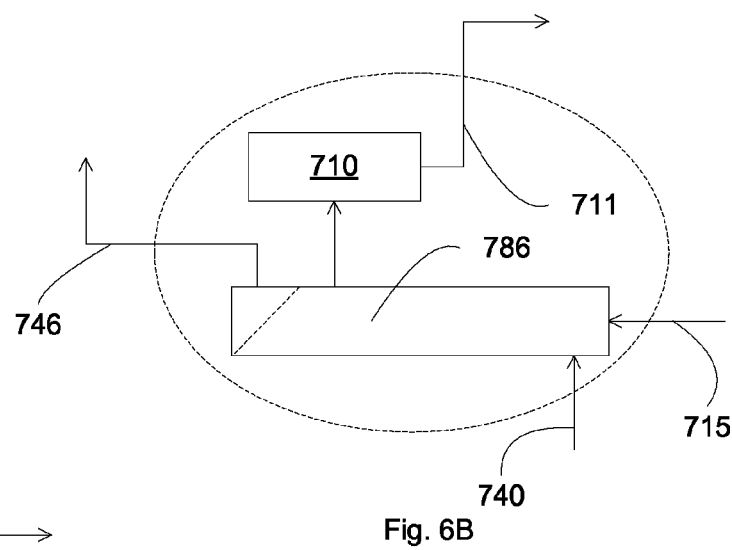
Figure 6C:
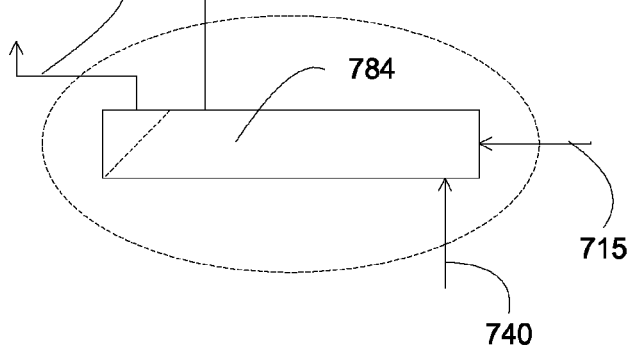

FIGS. 6A-6C illustrate exemplary alternative configurations for the regeneration and waste collection according to some embodiments of the present invention. In FIG. 6A, the gaseous collection assembly 780 can be incorporated within the catholyte reservoir 710 to form an integrated reservoir 788. A membrane can be provided to the reservoir 788 to collect the gaseous elements (e.g., unreacted nitrogen oxide in the catholyte effluent flow stream) to provide a gaseous waste stream 746, for example, to be converted to liquid waste at a waste container. The liquid catholyte can then be provided to the cathode as the catholyte flow stream 711. The oxidant regeneration flow stream 740 is provided to the catholyte effluent flow stream 715, either directly to the conduit that carries the catholyte effluent flow stream or to an assembly 718 coupled to the catholyte effluent flow stream.

In FIG. 6B, the gaseous collection assembly 780 can be incorporated with the oxidant regeneration assembly 741 to form an integrated gaseous collection assembly 786. The integrated gaseous collection assembly 786 is coupled to the catholyte effluent flow stream 715 to receive the catholyte effluent flow stream 715. A membrane can be provided to the integrated gaseous collection assembly 786 to collect the gaseous elements (e.g., unreacted nitrogen oxide in the catholyte effluent flow stream) to provide a gaseous waste stream 746, for example, to be converted to liquid waste at a waste container. The liquid catholyte can then be provided to the catholyte reservoir 710, which then supplies a catholyte flow stream 711 to the cathode. The oxidant regeneration flow stream 740 is preferably provided upstream of the membrane, allowing the nitrogen oxide in the catholyte effluent flow stream to be regenerated (e.g., reacted with the oxidant regeneration flow stream 740) before being collected as gaseous waste 746 to be disposed.

In FIG. 6C, the gaseous collection assembly 780 and the oxidant regeneration assembly 741 can be incorporated within the catholyte reservoir 710 to form an integrated reservoir 784. A membrane can be provided to the reservoir 784 to collect the gaseous elements (e.g., unreacted nitrogen oxide in the catholyte effluent flow stream) to provide a gaseous waste stream 746, for example, to be converted to liquid waste at a waste container. The liquid catholyte can then be provided to the cathode as the catholyte flow stream 711. The integrated gaseous collection assembly 784 is coupled to the catholyte effluent flow stream 715 to receive the catholyte effluent flow stream 715. The oxidant regeneration flow stream 740 is preferably provided upstream of the membrane, allowing the nitrogen oxide in the catholyte effluent flow stream to be regenerated (e.g., reacted with the oxidant regeneration flow stream 740) before being collected as gaseous waste 746 to be disposed.

In some embodiments, the present invention discloses electrochemical and fuel cell systems having internal laminar flow streams and, more specifically, to microfluidic electrochemical and fuel cells having two or more adjacent and cross-flowing (i.e., non-parallel) laminar flow streams positioned within an electrode pair assembly. The space or plenum that exist between the various electrode pair assemblies disclosed herein (i.e., flow-through electrodes and non-flow-through electrodes) are also sometimes referred to as a flow cell. As is appreciated by those skilled in the art, a fuel cell system generally comprises a stack of electrode pair assemblies (commonly referred to as a fuel cell electrode stack assembly), wherein each individual electrode pair assembly consists essentially of two opposing electrode structures, an anode and a cathode, ionically connected together via an interposing electrolyte.

Typical widths and heights associated with the microfluidic plenums and flow channels of the present invention generally range from about 10 to about 10,000 μm, preferably from about 50 to about 5,000 μm, and even more preferably from about 100 to about 1,000 μm. In some preferred embodiments, the anode and cathode are confronting and spaced apart a distance of about 50 microns to about 1 millimeter (i.e., .about.1 mm), and more preferably from about 100 microns to about 400 microns. Finally, the flow velocities associated with the internal laminar flow streams of certain embodiments of the present invention generally range from about 2 μm/min to about 100 μm/min, and fluid fluxes (associated with certain flow-through electrode embodiments) generally range from about 10 $\mu m/min/cm^2$ to about 500 $\mu m/min/cm^2$.

Empirical tests were then run using prototype electrode pair and stack assemblies and configurations. In this regard, silicon-based flow-through anode and cathode 2×2 cm square coupons (i.e., electrodes) were first obtained as described above and then assembled into respective anode and cathode housing structures (i.e., an appropriately configured polycarbonate housing structures as depicted as layers C and G in FIGS. 7 and 8). The anode and cathode housing structures holding the coupons were then assembled into (1) a 1-cell (i.e., a single pair of electrodes) fuel cell stack as shown in FIGS. 7 and 8, and (2) a 4-cell fuel cell stack (not shown).

Figure 7:
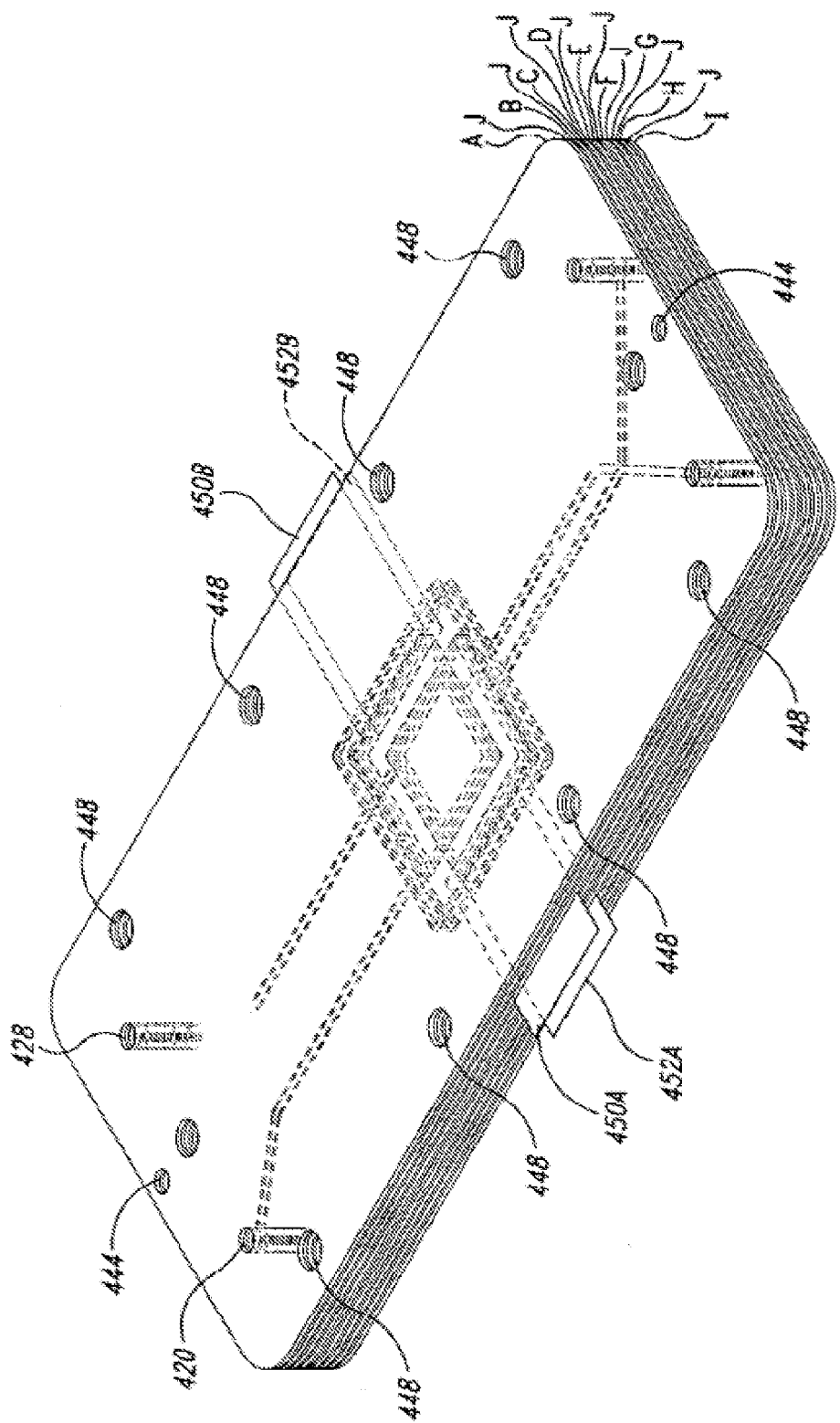
FIG. 7 is a pictorial view of an exemplary prototype fuel cell assembly adapted to flow an anolyte flow stream through and adjacent to a first electrode, and a catholyte flow stream through and adjacent to a second electrode in accordance with an embodiment of the present invention. The fuel cell assembly is drawn to scale and represents a configuration useful for purposes of testing and design validation.
Figure 8:
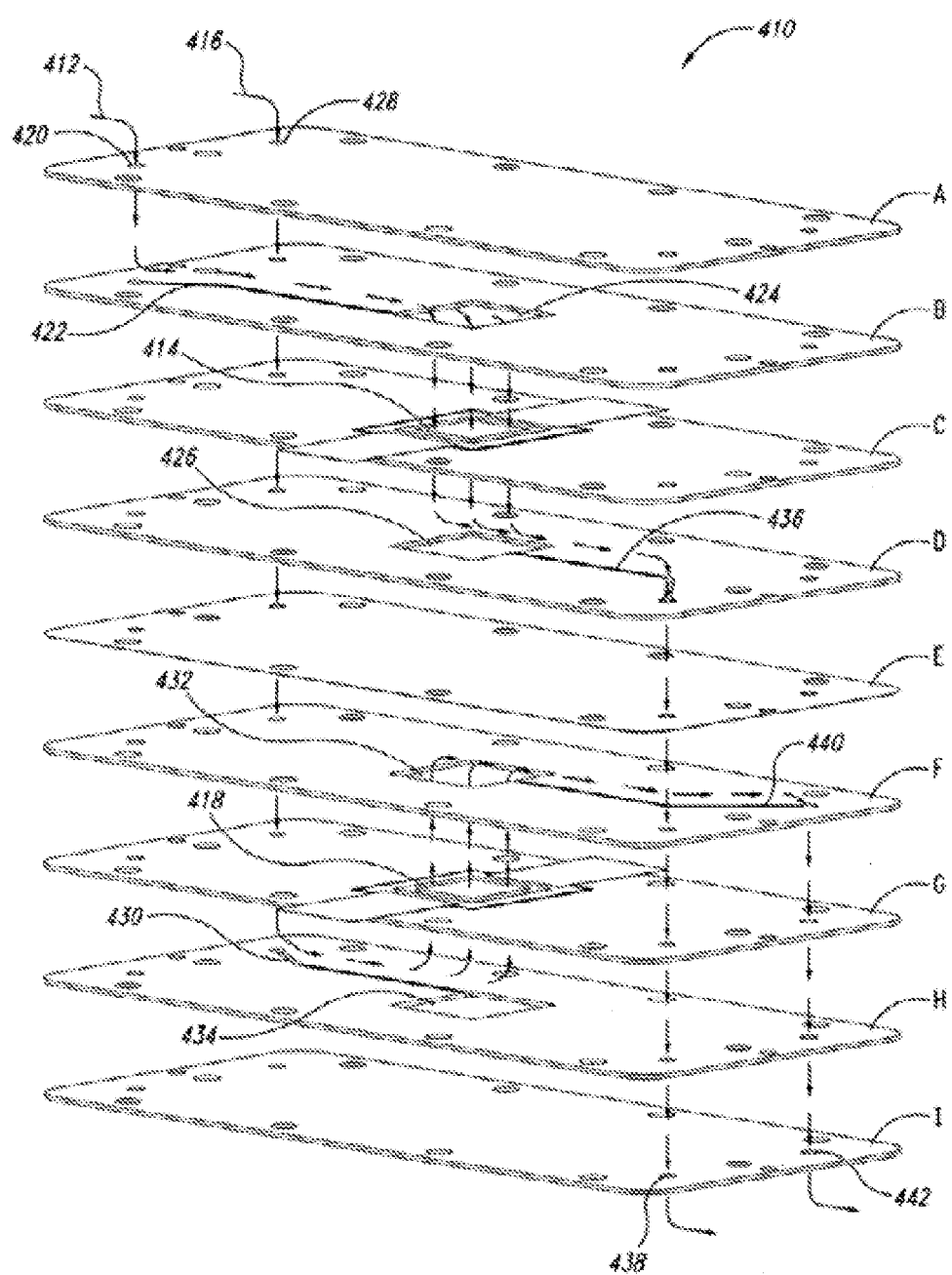
FIG. 8 is an exploded view of the fuel cell assembly shown in FIG. 7, wherein arrows represent generalized flow paths associated with the anolyte and catholyte flow streams.

More specifically, and as shown in FIGS. 7 and 8, a fuel cell assembly prototype 410 was constructed to flow (1) and anolyte flow stream 412 through and adjacent to a first porous silicon flow-through electrode 414, and (2) a catholyte flow stream 416 through and adjacent to a second porous silicon flow-through electrode 418 for purposes of testing and design validation. As shown, the anolyte flow stream 412 initially enters a first inlet port 420 and travels along a first inlet channel 422 and then enters a first plenum 424. The anolyte flow stream 412 then passes through the first flow-through electrode 414 and enters a second plenum 426. Similarly, the catholyte flow stream 416 initially enters a second inlet port 428 and travels along a second inlet channel 438 and then enters a third plenum 432. The catholyte flow stream 416 then passes through the second flow-through electrode 418 and enters a fourth plenum 434. A NAFION membrane layer E separates the third plenum 430 from the second plenum 426.

Next, the anolyte flow stream 412 (effluent) enters and travels along a first outlet channel 436 and exits through a first outlet port 438. Similarly, the catholyte flow stream 416 (effluent) enters and travels along a second outlet channel 440 and exits through a second outlet port 442.

The fuel cell assembly prototype 410 was constructed from eight distinct layers A-D, F-I of appropriately machined translucent polycarbonate (sheet or film available from McMaster-Carr, U.S.A.), wherein each opposing polycarbonate layer was bonded together by interposing layers J of silicone-tape (available from Adhesive Research, Inc., U.S.A.) (shown in FIG. 7, but not shown in exploded view FIG. 8). In order to properly align the various layers, a pair of opposing alignment holes 444 was used. In addition, a plurality of through-holes 446 was used to secure the various layers together with a plurality of corresponding bolts (not shown). Finally, opposing pairs of protruding gold-plated copper strips 450A-B, 452A-B were attached to the first and second flow-through coupons (electrodes) 414, 418, respectively. The protruding strips 450A-B, 452A-B were used together with appropriate connectors (not shown) to complete an electric circuit between the first and second flow-through electrodes 414, 418.

In some embodiments, the regeneration conduit can be a microfluidic conduit, coupled to the microfluidic catholyte effluent flow stream. The microfluidic regeneration flow stream can be highly effective, especially with gaseous sparging regeneration, for example, with oxygen or air flow stream. Since the size of the microfluidic catholyte effluent conduit is small, the chance that nitrogen oxide in the catholyte effluent flow stream contacts and reacts with the oxygen sparging from the microfluidic regeneration flow stream is greater, resulting in potential higher regeneration efficiency. In addition, the sparging process can provide gas bubbles smaller than the size of the regeneration conduit, for example, through a porous element, thus can further improve the reaction efficiency of the regeneration process.

Figure 9:
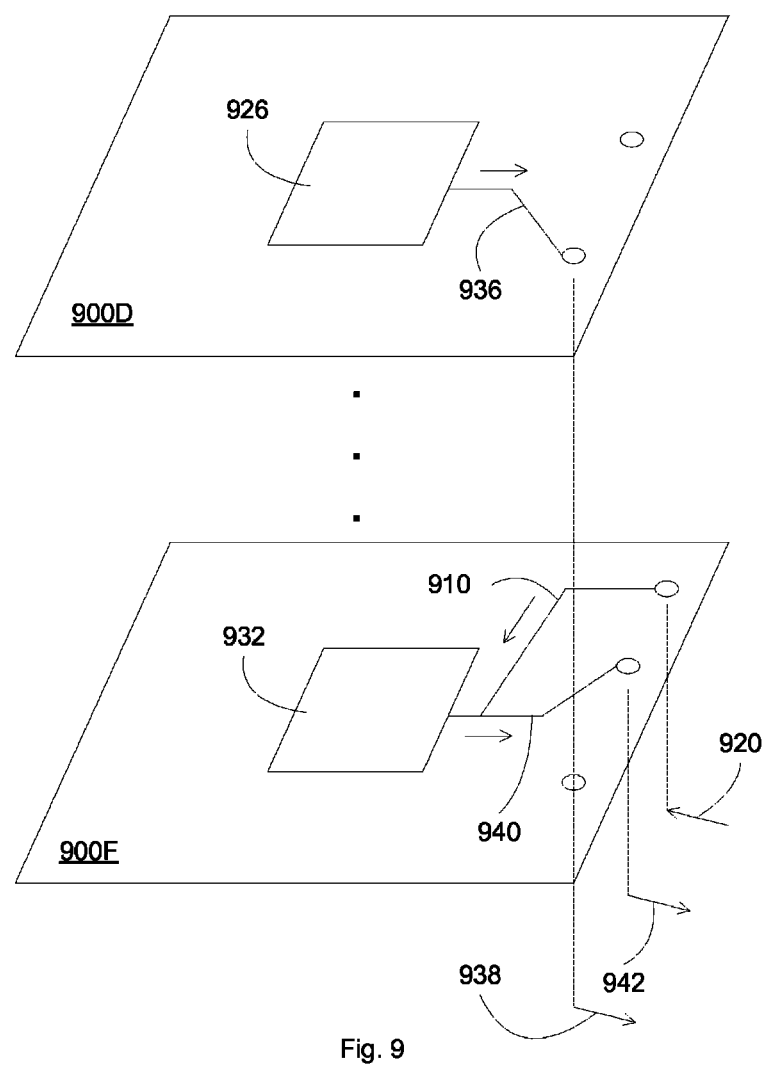
FIG. 9 illustrates an exemplary microfluidic electrochemical and fuel cells having microfluidic regeneration capability according to some embodiments of the present invention. The fuel cell comprises microfluidic conduits for a portion of the conduits carrying the catholyte flow stream, the catholyte effluent flow stream, and/or the oxygen-containing flow stream.

FIG. 9 illustrates an exemplary microfluidic electrochemical and fuel cells having microfluidic regeneration capability according to some embodiments of the present invention. The fuel cell comprises microfluidic conduits for a portion of the conduits carrying the catholyte flow stream, the catholyte effluent flow stream, and/or the oxygen-containing flow stream. The size of the microfluidic conduit is in order of microns, such as between 10 to 1000 microns. For example, multiple thin plates can be attached together, with cuts in the plates for conduits of flow stream. The fuel cell comprises multiple layers bonded together as shown previously. Layer 900D comprises a microfluidic conduit 936, carrying the anolyte effluent flow stream from the anode (not shown) through the surface 926. The anolyte flow stream from multiple layers can be connected together to form an external anolyte flow stream 938 flowing out of the fuel cell, for example, back to the anolyte reservoir.

Layer 900F comprises a microfluidic conduit 940, carrying the catholyte effluent flow stream from the cathode (not shown) through the surface 932. The catholyte flow stream from multiple layers can be connected together to form an external catholyte flow stream 942 flowing out of the fuel cell, for example, back to the catholyte reservoir. An oxidant regeneration flow stream 920 can be provided to the fuel cell, through a microfluidic conduit 910, which is coupled to the catholyte effluent flow stream 940.

Other configurations can be used, for example, a longer microfluidic catholyte effluent conduit 940, such as a conduit configured to travel along the surface of layer 900F or a serpentine conduit, to increase the resident time, or the reaction rate of oxygen with nitrogen oxide, effectively increasing the regeneration efficiency.

Figure 10A:
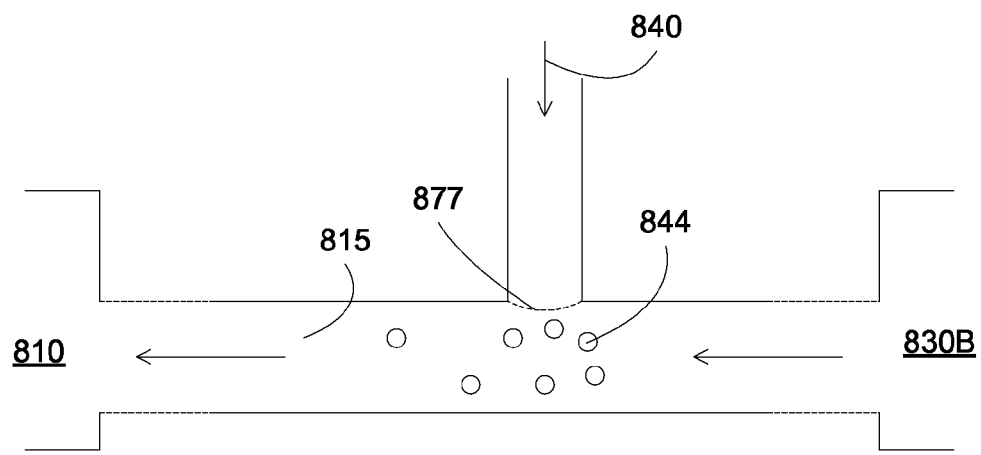
FIGS. 10A-10C illustrate exemplary configurations of a regeneration conduit that is coupled to a catholyte effluent flow stream according to some embodiments of the present invention.
Figure 10B:
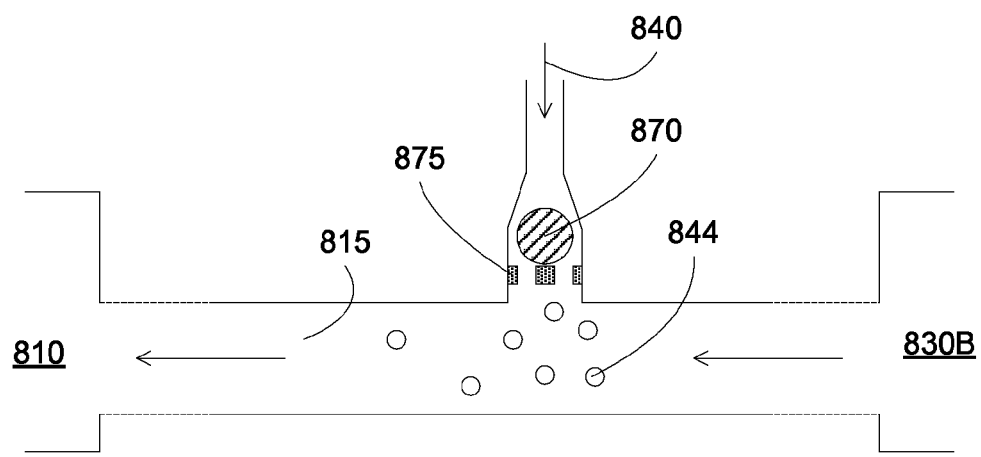
Figure 10C:
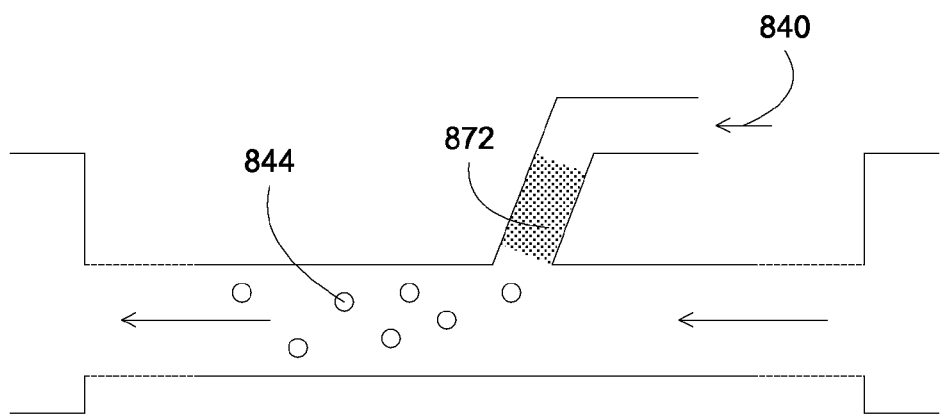

FIGS. 10A-10C illustrate exemplary configurations of a regeneration conduit that is coupled to a catholyte effluent flow stream according to some embodiments of the present invention. The figures show a sparging process, comprising introducing a gas flow stream 840, preferably oxygen-containing gas such as oxygen or air, to a liquid catholyte flow 815, for example, from cathode 830B to catholyte reservoir 810. The gas 840 can be sparged to the liquid 815, forming gaseous bubbles 844 that contact and react with the components of the liquid, such as nitrogen oxide and water to convert to liquid nitric acid. Other processes can be used and are within the scope of the present invention, including introducing a liquid regeneration flow stream to a liquid catholyte effluent flow stream.

In some embodiments, the regeneration conduit can comprise a one-way flow element, permitting gaseous elements to pass through while restricting liquid elements. For example, the regeneration conduit can comprise a membrane, allowing gaseous elements to pass through while stopping liquid elements, thus can provide gaseous oxygen to the catholyte effluent flow stream while not affecting the catholyte effluent flow stream. For example, the membrane can be positioned at an intersection of the oxygen-containing flow stream with the catholyte effluent flow stream, allowing gaseous elements to pass through. The regeneration conduit can be a microfluidic conduit, coupled to a microfluidic catholyte effluent flow stream. Alternatively, the regeneration conduit can be coupled to the catholyte effluent flow stream outside the fuel cell element.

FIG. 10A shows an exemplary membrane 877, separating the regeneration flow 840 from the catholyte flow 815, wherein the membrane allows passage of gaseous elements and blocks passage of liquid elements. The regeneration flow thus can be introduced to the liquid flow stream without any back flow of liquid to the regeneration flow. The membrane can comprise opposing hydrophilic and hydrophobic membranes as discussed above. Alternatively, the membrane can comprise a mesh, and optionally relying on high gaseous pressure at the regeneration conduit to block the back flow of liquid.

In some embodiments, the regeneration conduit can comprise a check valve, such as an inline breather, coupling the gaseous oxygen-containing flowing stream to the catholyte effluent flow stream. The check valve can allow gaseous elements to pass through while stopping liquid elements.

FIG. 10B shows an exemplary check valve, comprising a ball 870 stopped by a mesh 875. Gaseous flow from the regeneration conduit can travel to the liquid flow stream, but when the liquid pressure is higher than the gas pressure, the ball is pushed back against the wall of the regeneration conduit, stopping the liquid flow. Other check valve configurations can be used.

In some embodiments, the regeneration conduit can comprise a porous element, coupling the gaseous oxygen-containing flowing stream to the catholyte effluent flow stream. The porous element can has pore sizes of microns, such as 1-1000 microns, or even submicron pore sizes. The porous element can be positioned at an intersection of the oxygen-containing flow stream with the catholyte effluent flow stream, with or without protruding to the catholyte effluent flow stream, allowing gaseous elements to pass through to the catholyte effluent flow stream.

FIG. 10C shows an exemplary porous element 872, disposed between the regeneration flow and the liquid flow. The porous element 872 comprises small pores, for example, less than 1 mm diameter pores, or less than 500 micron diameter size, or preferably less than 200 micron diameter size. The small pores can allow passage of gas while blocking liquid, relaxing a pressure differential requirement between the regeneration conduit and the liquid conduit.

Other configurations can be used, such as directly coupling the regeneration flow 840 with the liquid flow 815 without any intervening element (such as the regeneration conduit is direct coupled to the liquid conduit), or with a configuration restrictor (such as the cross section area of the regeneration conduit is smaller than the cross section area of the liquid conduit).

In some embodiments, a flow regulator can be coupled to the catholyte effluent flow stream to regulate the incorporation of the oxygen-containing flow stream. The regulator can be positioned before, after, or both before and after the intersection with oxygen-containing flow stream.

In some embodiments, the present invention discloses methods and systems for operating a fuel cell, comprising collecting gaseous byproducts from the catholyte effluent flow stream and then converting the gaseous byproducts to liquid forms for easy disposal. For example, a fuel cell can utilize nitric acid in a catholyte flow stream, which then contact and react at a cathode to generate nitrogen oxide, e.g., $NO_x$ or $N_xO_y$, in a catholyte effluent flow stream. The nitrogen oxide can be collected and routed to a liquid oxidant reservoir to convert the nitrogen oxide to a liquid form. In some embodiments, the liquid oxidant comprises hydrogen peroxide, which then reacts with the nitrogen oxide to convert the nitrogen oxide to nitric acid. The liquid nitric acid can be much easier to be disposed, as compared to the gaseous nitrogen oxide.

In some embodiments, a waste conduit can be coupled to the catholyte reactant. For example, a waste conduit can be coupled to the catholyte effluent conduit or flow stream. The waste conduit can be configured to collect gaseous components in the catholyte effluent flow stream, for example, intercepting the gaseous nitrogen oxide within the liquid catholyte effluent flow stream and channeling the nitrogen oxide to a waste disposal container.

The waste conduit can comprise a membrane, allowing gaseous elements to pass through while stopping liquid elements, thus can collect gaseous byproducts while not affecting the catholyte effluent flow stream. For example, the membrane can be positioned at a corner of the flow stream, allowing gaseous elements to pass through. Alternatively, the waste conduit can be configured above the catholyte flow stream, such as at a dead space corner, allowing gaseous elements to rise and be collected. The waste disposal container can comprise a liquid oxidant, such as hydrogen peroxide, to react and convert the nitrogen oxide into nitric acid.

Figure 11A:
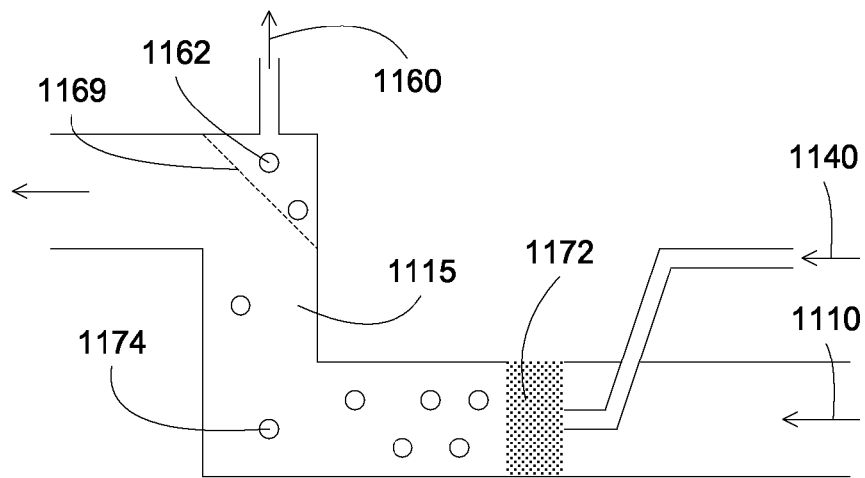
FIGS. 11A-11B illustrate exemplary configurations for collecting gaseous byproducts in the catholyte effluent flow stream according to some embodiments of the present invention.
Figure 11B:
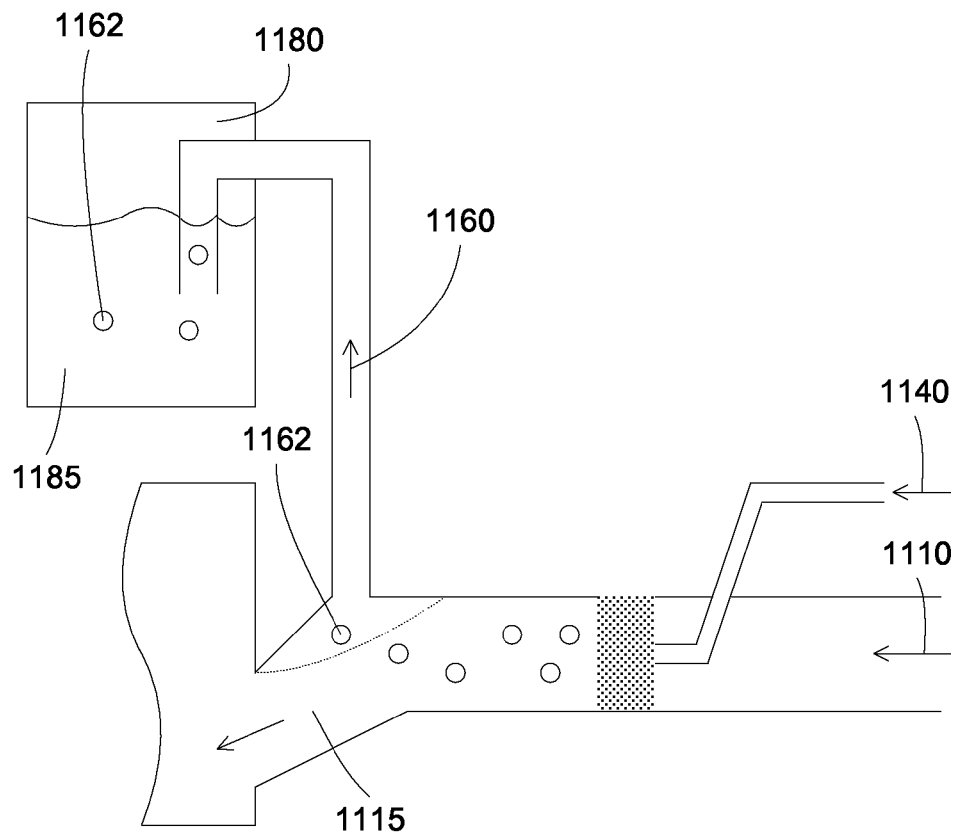

FIGS. 11A-11B illustrate exemplary configurations for collecting gaseous byproducts in the catholyte effluent flow stream according to some embodiments of the present invention. In FIG. 11A, a membrane 1169 can be disposed within the catholyte flow 1115 to collect gaseous element 1162, which can form a gaseous waste flow stream 1160 out of the liquid catholyte flow 1115. The gaseous flow stream 1160, comprising gaseous elements within the catholyte effluent flow stream such as nitrogen oxide, can be removed from the liquid flow stream to be disposed. An optional regeneration flow stream can be included upstream of the waste collection, for example, to regenerate the nitrogen oxide back to nitric oxide. Thus only the gases that do not undergo regeneration are captured and disposed. A generation flow stream 1140 is provided to a liquid catholyte flow stream 1110, for example, through gas sparging using a porous element 1172. The porous element 1172 can be disposed within the catholyte conduit, effectively increasing the contact surface for the liquid in order to increase the contact and reaction rate between the catholyte flow stream and the regeneration flow stream.

In some embodiments, the regeneration flow stream comprises a gas, such as oxygen, air or any oxygen-containing gas. The gaseous elements can be sparged through the liquid, forming bubbles 1174 which then contact and react with the liquid flow stream. The remaining bubbles, together with the unreacting gas in the liquid, can be collected through the membrane 1169 to be disposed in a gaseous flow stream 1160. In some embodiments, the regeneration flow stream can comprise a liquid flow stream, such as hydrogen peroxide. The liquid regeneration flow stream can react with the catholyte by-products, e.g., nitrogen oxide, to regenerate the catholyte flow stream. The remaining gaseous by-products, e.g., the unreacted nitrogen oxide, can be collected and disposed in a waste disposal container.

In FIG. 11B, the membrane is optional, and gaseous elements, as shown as bubbles 1162, are collected to form a flow stream 1160 out of the liquid flow stream 1110. In some embodiments, the gaseous flow stream 1160 is delivered to a waste disposal container 1180, containing an oxidizer liquid 1185, such as hydrogen peroxide. The gaseous elements 1162 is then bubbled to the hydrogen peroxide 1185, and react with hydrogen peroxide to convert the gaseous elements, e.g., nitrogen oxide, to liquid form, e.g., of nitric acid. The nitric acid is in liquid form, and thus is much easier to dispose, as compared to the gaseous form of nitrogen oxide.

In some embodiments, the present invention discloses methods and apparatuses to dispose waste by products from a fuel cell system, comprising converting the gaseous waste from the fuel cell to liquid form before being disposed. For example, the gaseous waste of nitrogen oxide, generated from the fuel cell chemical reaction at the anode/cathode fuel cell assembly, is collected and brought to a liquid oxidizer (comprising oxygen and water), where the gaseous nitrogen oxide reacts with oxygen and water in the liquid oxidizer to be converted to nitric acid.

Figure 12:
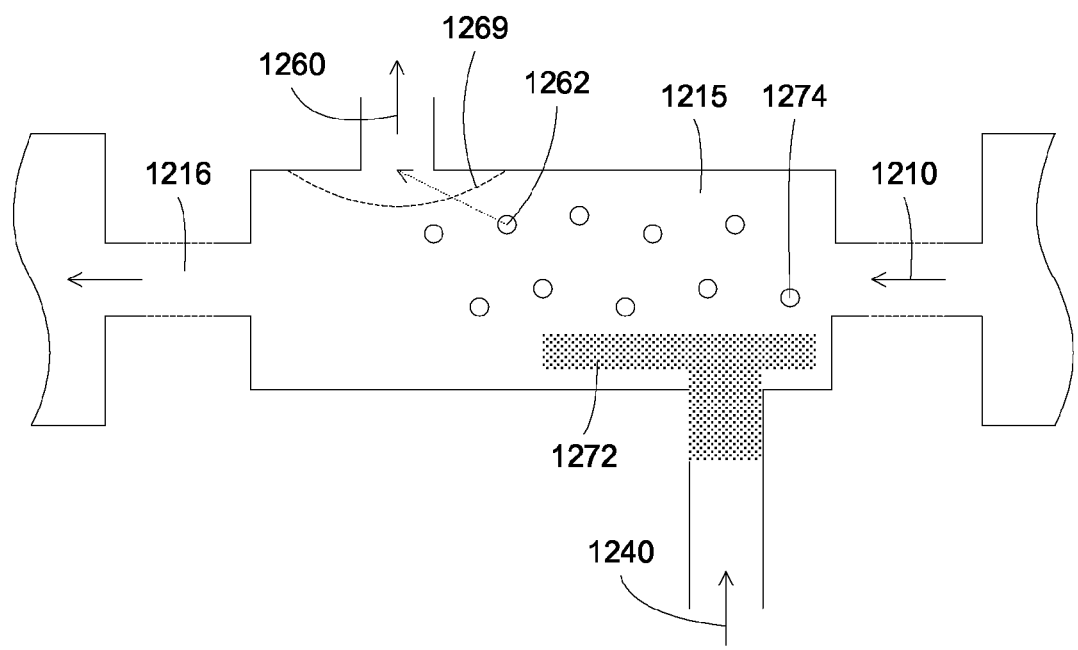
FIG. 12 illustrates another exemplary configuration for collecting gaseous byproducts in the catholyte effluent flow stream according to some embodiments of the present invention.

FIG. 12 illustrates another exemplary configuration for collecting gaseous byproducts in the catholyte effluent flow stream according to some embodiments of the present invention. An optional membrane 1269 can be disposed within the catholyte flow 1215 to collect gaseous element 1262, which can form a gaseous waste flow stream 1260 out of the liquid catholyte flow 1215. A regeneration flow stream 1240 can be included upstream of the waste collection, for example, to regenerate the nitrogen oxide back to nitric oxide. The generation flow stream 1240 is sparging to a liquid catholyte flow stream 1210 through a porous element 1272, which is disposed within the regeneration conduit and extended toward the catholyte flow stream. Oxygen bubbles 1274, e.g., air, oxygen or oxygen-containing gas, is delivered from the regeneration flow stream 1240 to the liquid catholyte flow stream 1210 for regenerating the catholyte 1215. Un-reacted bubbles 1262, e.g., nitrogen oxide from the liquid catholyte or oxygen bubbles 1274 from the regeneration flow 1240, can be collected through the optional membrane and are delivered as a waste flow stream 1260, for example, to be converted to liquid form by reacting with hydrogen peroxide. The output flow 1216 can comprise the catholyte liquid, with gaseous elements removed from the liquid flow 1216.

Other configurations can also be used, for example, waste collection of the gaseous by-products, e.g., nitrogen oxide in the catholyte flow stream, for converting the gaseous waste to liquid waste for ease of disposal without any regeneration flow stream.

In some embodiments, the present invention discloses a nitric acid regeneration fuel cell system. The fuel cell system can include an anode and anode conduits fluidly connected to the anode. The anode conduits can include an inlet anode conduit for providing an anolyte flow stream to the anode. The anode conduits can include an outlet anode conduit for delivering an anolyte effluent flow stream from the anode. The anolyte flow stream can include a fuel for reacting at the anode. The fuel cell system can include a cathode and cathode conduits fluidly connected to the cathode. The cathode conduits can include an inlet cathode conduit for providing a catholyte flow stream to the cathode. The cathode conduits can include an outlet cathode conduit for delivering a catholyte effluent flow stream from the cathode. The catholyte flow stream can include nitric acid for reacting at the cathode. The catholyte flow stream can react at the cathode to yield gaseous nitrogen oxide in the catholyte effluent flow stream. The fuel cell system can include a waste conduit fluidly connected to the catholyte effluent flow stream. The waste conduit can be configured to accept unreacted gaseous nitrogen oxide in the catholyte effluent flow stream. The fuel cell system can include a liquid oxidant reservoir fluidly connected to the waste conduit. The liquid oxidant reservoir can be configured to react with the unreacted gaseous nitrogen oxide.

In some embodiments, the fuel cell system can further include a regeneration conduit fluidly connected to the catholyte effluent flow stream. The regeneration conduit can be configured to deliver an oxygen-containing flow stream for bubbling through the catholyte effluent flow stream. The oxygen-containing flow stream can be configured to contact and react with the gaseous nitrogen oxide of the catholyte effluent flow stream.

In some embodiments, the oxygen-containing flow stream comprises air, and the oxidant reservoir comprises hydrogen peroxide. The anolyte flow stream can flowingly contact and pass through the anode. The catholyte flow stream can flowingly contact and pass by the cathode. The anode can include porous silicon to allow the anolyte flow stream to flow through. The cathode can include porous silicon to allow the catholyte flow stream to flow by. The oxygen-containing flow stream can react with the nitrogen oxide to yield a regenerated nitric acid flow stream joining the catholyte flow stream. The liquid oxidant reservoir can react with the unreacted nitrogen oxide to yield nitric acid and prevent releasing of nitrogen oxide in the gaseous form. A portion of the anode conduits, the cathode conduits and the regeneration conduit can include a microfluidic conduit disposed within a plate sandwiched between other plates. The regeneration conduit can be coupled to the outlet cathode conduit or a reservoir of the catholyte flow stream. The regeneration conduit can be coupled to the catholyte effluent flow stream through a porous element. The regeneration conduit can be coupled to the catholyte effluent flow stream through a check valve. The regeneration conduit can be coupled to the catholyte effluent flow stream through a membrane, wherein the membrane can allow gaseous oxygen-containing flow stream to enter the catholyte effluent flow stream while preventing the liquid catholyte effluent flow stream from entering the oxygen-containing flow stream.

In some embodiment, the fuel cell system can further include a flow restrictor coupled to the catholyte effluent flow stream. The fuel cell system can include a catholyte reservoir, wherein the catholyte reservoir can be fluidly connected to the catholyte inlet conduit and the catholyte outlet conduit, and wherein the catholyte flow stream can form a close-loop from the catholyte reservoir to the catholyte inlet conduit to the cathode to the catholyte outlet conduit and back to the catholyte reservoir.

In some embodiments, the fuel cell can comprise a close-loop catholyte flow stream, which starts from a cathode reservoir, forming a catholyte flow stream toward the cathode, reacting at the cathode, then forming a catholyte effluent flow stream away from the cathode, and then returning to the cathode reservoir. The catholyte flow stream can comprise nitric acid, acting as an oxidant to react at the cathode, to form nitrogen oxide and water. The catholyte effluent flow stream then comprises the by products of the catholyte reaction at the cathode, generally comprising nitrogen oxide and water, together with un-reacted nitric acid. The waste conduit can be coupled to the cathode reservoir to collect gaseous nitrogen oxide.

In some embodiments, the present invention discloses methods for operating a fuel cell, comprising collecting gaseous byproducts from the catholyte effluent flow stream and then converting the gaseous byproducts to liquid forms for easy disposal.

Figure 13A:
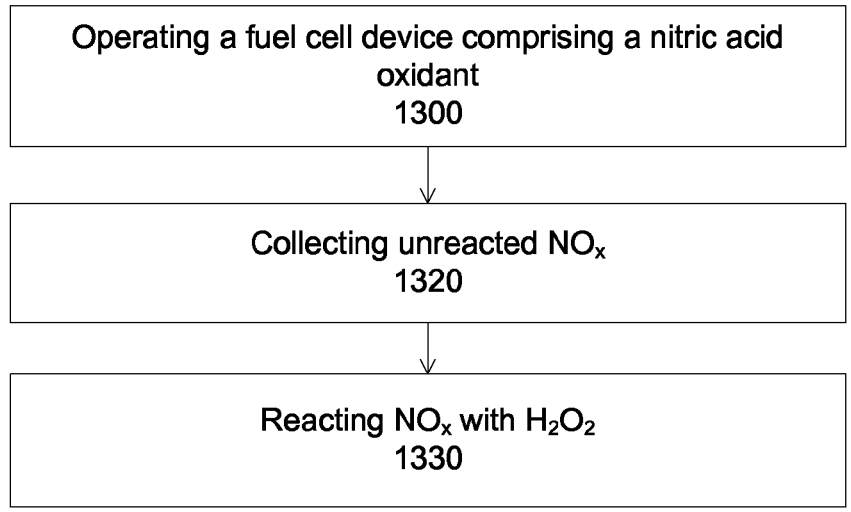
FIG. 13A illustrates an exemplary flow chart for waste disposal for a fuel cell according to some embodiments of the present invention.

FIG. 13A illustrates an exemplary flow chart for waste disposal for a fuel cell according to some embodiments of the present invention. In operation 1300, a fuel cell device is operated, comprising running a nitric acid oxidant as a catholyte flow stream. An anolyte flow stream comprising a fuel can be included. In operation 1320, the nitric acid oxidant reacts with the anolyte flow to generate a by-products, such as nitrogen oxide, e.g., $NO_x$ or $N_xO_y$, which is collected, forming a waste flow stream and is directed away from the catholyte flow stream. In operation 1330, the waste stream is brought to a liquid oxidant, such as hydrogen peroxide in a waste container, where the nitrogen oxide reacts with hydrogen peroxide to form liquid nitric acid.

In some embodiments, the present invention discloses methods for regenerating and operating a fuel cell, comprising sparging a catholyte effluent flow stream with a gaseous oxygen-containing flow stream to regenerate the catholyte effluent flow stream, together with collecting gaseous byproducts from the catholyte effluent flow stream and then converting the gaseous byproducts to liquid forms for easy disposal. Alternatively, the method can include flowing a liquid oxygen-containing flow stream to regenerate the catholyte effluent flow stream, together with collecting gaseous byproducts from the catholyte effluent flow stream and then converting the gaseous byproducts to liquid forms for easy disposal.

Figure 13B:
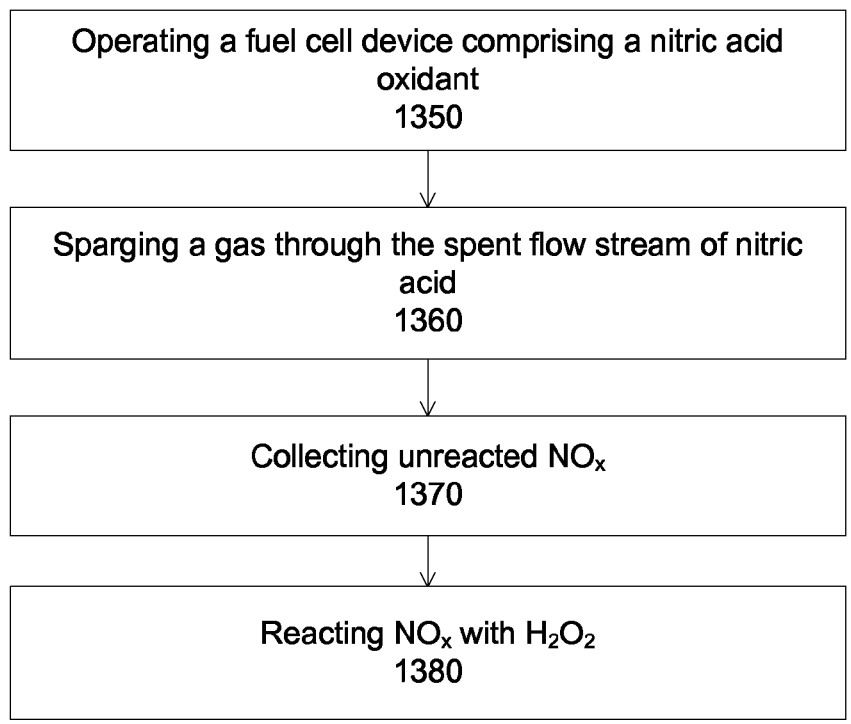
FIG. 13B illustrates an exemplary flow chart for regeneration together with waste disposal for a fuel cell according to some embodiments of the present invention.

FIG. 13B illustrates an exemplary flow chart for regeneration together with waste disposal for a fuel cell according to some embodiments of the present invention. In operation 1350, a fuel cell device is operated, comprising running a nitric acid oxidant as a catholyte flow stream. An anolyte flow stream comprising a fuel can be included. The nitric acid oxidant reacts with the anolyte flow to generate nitrogen oxide, such as $NO_x$ or $N_xO_y$. In operation 1360, a regeneration flow stream is provided through the catholyte, preferably through the catholyte effluent flow stream to regenerate the nitrogen oxide back to nitric acid. The regeneration flow stream can include a gaseous flow stream sparging through the catholyte, or a liquid flow stream entering the catholyte. In operation 1370, the nitrogen oxide is collected, forming a waste flow stream and is directed away from the catholyte flow stream. In operation 1380, the waste stream is brought to a liquid oxidant, such as hydrogen peroxide in a waste container, where the nitrogen oxide reacts with hydrogen peroxide to form liquid nitric acid.

In some embodiments, the present invention discloses a method for regenerating a fuel cell. The method can include flowing an anolyte flow stream to an anode, wherein the anolyte flow stream comprises a fuel for reacting at the anode; flowing a catholyte flow stream to a cathode, wherein the catholyte flow stream comprises nitric acid for reacting at the cathode to yield gaseous nitrogen oxide in a catholyte effluent flow stream; flowing an oxygen-containing flow stream to the catholyte effluent flow stream, wherein the oxygen-containing flow stream bubbles through the catholyte effluent flow stream to react with the gaseous nitrogen oxide of the catholyte effluent flow stream; collecting a portion of the gaseous nitrogen oxide, e.g., the unreacted nitrogen oxide, in the catholyte effluent flow stream; delivering the portion of the gaseous nitrogen oxide to a liquid oxidant reservoir, wherein the liquid oxidant reservoir is configured to react with the portion of the gaseous nitrogen oxide.

In some embodiments, the oxygen-containing flow stream can include air. The oxidant reservoir can include hydrogen peroxide. The anolyte flow stream can flowingly contact and pass through the anode. The catholyte flow stream can flowingly contact and pass by the cathode. The anode can include porous silicon to allow the anolyte flow stream to flow through. The cathode can include porous silicon to allow the catholyte flow stream to flow by. The oxygen-containing flow stream can react with the nitrogen oxide to yield a regenerated nitric acid flow stream joining the catholyte flow stream. The liquid oxidant reservoir can react with the unreacted nitrogen oxide to yield nitric acid and prevent releasing of nitrogen oxide in the gaseous form. A portion of the anolyte flow stream, the catholyte flow stream, and the oxygen-containing flow stream can include a microfluidic conduit disposed within a plate sandwiched between other plates. The oxygen-containing flow stream can be coupled to the catholyte effluent flow stream or a reservoir of the catholyte flow stream. The oxygen-containing flow stream can be coupled to the catholyte effluent flow stream through a porous element. The oxygen-containing flow stream can be coupled to the catholyte effluent flow stream through a check valve. The oxygen-containing flow stream can be coupled to the catholyte effluent flow stream through a membrane, wherein the membrane allows gaseous oxygen-containing flow stream to enter the catholyte effluent flow stream while preventing the liquid catholyte effluent flow stream from entering the oxygen-containing flow stream. The catholyte reservoir is fluidly connected to the catholyte inlet conduit and the catholyte outlet conduit. The catholyte flow stream forms a close-loop from the catholyte reservoir to the catholyte inlet conduit to the cathode to the catholyte outlet conduit and back to the catholyte reservoir. In some embodiments, the method can further include restricting the catholyte effluent flow stream.

In some embodiments, the present invention discloses methods and systems for regenerating a fuel cell, comprising intermittently regenerating an oxidant flow stream, for example, based on detected conditions. For example, the fuel cell can comprise a regenerating assembly, coupled to the catholyte liquid for controllably regenerating the catholyte liquid. The regenerating assembly can comprise a controller, such as a controllable valve, for starting the regenerating flow stream. The fuel cell can comprise a sensor for detecting conditions of the fuel cell, such as the concentration of the catholyte effluent flow stream or the catholyte reservoir, the power of fuel cell, or the number of running cycles of the fuel cell. In some embodiments, based on the inputs from the sensor, the regenerating assembly can start to regenerate the catholyte flow stream. Alternatively, the regenerating assembly can be manually started, for example, when an operator desires higher fuel cell power.

In some embodiments, the controller comprises a controllable valve, switching between no regeneration, regeneration with air, regeneration with hydrogen peroxide, or any combination. The controllable valve can be manually controlled, or automatically controlled through a sensor. For example, the sensor can sense the concentration of the catholyte liquid, either at the catholyte effluent flow stream or at the catholyte reservoir. When the concentration is below a setpoint, the sensor can trigger the controller to start the regeneration process. The sensor can sense the power level of the fuel cell, and when the power level drops below a setpoint, the sensor can trigger the controller to start the regeneration process. Alternatively, the sensor can be a counter, counting the number of running cycles of the fuel cell, and when a setpoint is reached, the sensor can trigger the controller to start the regeneration process.

In some embodiments, the controller can change between no regeneration, regeneration with gaseous oxidant flow stream, such as air or oxygen-containing gas flow, and regeneration with liquid oxidant, such as liquid hydrogen peroxide. For example, the fuel cell can be normally operated under no regeneration. When high power is required, or when the concentration of the catholyte reagent is below a preset point, air regeneration can be switched on. For optimum power, hydrogen peroxide regeneration can be used.

Figure 14:
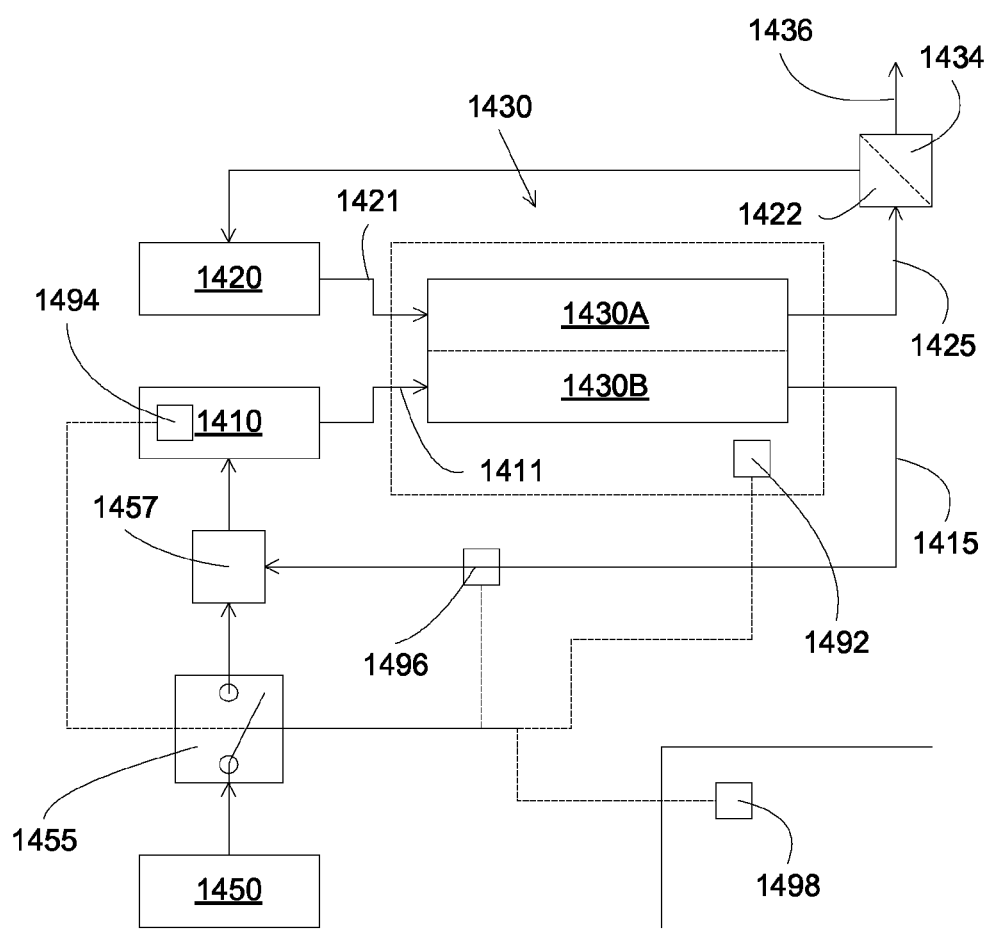
FIG. 14 illustrates an exemplary fuel cell system comprising an intermittent regeneration assembly according to some embodiments of the present invention.

FIG. 14 illustrates an exemplary fuel cell system comprising an intermittent regeneration assembly according to some embodiments of the present invention. The regeneration cell system 1430 comprises an anode 1430A and a cathode 1430B that are confronting and spaced apart from each other. Anolyte flow stream 1421 from an anolyte reservoir 1420 comprising a fuel is supplied in a close loop to the anode 1430A, reacted at the anode and become an anolyte effluent flow stream 1425 that returns to the anolyte reservoir 1420. An optional pumping assembly can also be included to circulate the anolyte flow stream 1421. A degassing assembly 1434 can be included for degassing the anolyte effluent flow stream 1425, containing a gas separation membrane to separate the liquid component 1422 from the gaseous component, which can be released in a gaseous flow stream 1436.

Catholyte flow stream 1411 from a catholyte reservoir 1410 comprising a primary oxidant, such as nitric acid, is also supplied in a close loop to the cathode 1430B, reacted at the cathode 1430B, become a catholyte effluent flow stream 1415 and then return to the catholyte reservoir 1410. An optional pumping assembly can also be included to circulate the catholyte flow stream 1411.

A nitric acid regeneration assembly 1450 is coupled to the catholyte effluent flow stream 1415 at 1457, for example, through a fan for providing a gaseous air oxidant or through a reservoir/pump assembly for providing liquid oxidant. The nitric acid regeneration assembly is coupled to the catholyte flow stream through a switchable connector 1455, thus the regeneration capability can be controlled. For example, an open connector 1455 stops the regeneration flow, terminating the regeneration process. A close connector 1455 enables the regeneration flow, providing regeneration oxidant to the catholyte flow stream.

The switchable connector 1455 can be manually controlled, for example, by an operator deciding the need for regeneration. Alternatively, the switchable connector can be automatically controlled through sensors which can monitor the conditions of the fuel cell, and can determine the need for regeneration. A sensor can be used to determine the concentration of the catholyte, for example, monitoring the level of oxidant such as nitric acid. When the concentration is low, for example, below a setpoint, the sensor can be triggered, turning on the regeneration flow stream. In some embodiments, a concentration sensor 1494 can be positioned at the reservoir to monitor the oxidant level at the reservoir 1410. Another concentration sensor 1496 can be positioned at the catholyte effluent flow stream 1415, monitoring the oxidant level within the catholyte effluent flow stream.

In some embodiments, a sensor 1492 can monitor the power level of the fuel cell, for example, by coupling to the voltage output or current output of the fuel cell. When the fuel cell loses performance, e.g., having power drops below a setpoint, the sensor can be triggered, turning on the regeneration flow stream. In some embodiments, a sensor 1498 can comprise a counter, counting a characteristic of the fuel cell operation, such as a number of running cycles, a time that the fuel cell has been operated, or a power that has been delivered. When the counter reaches a setpoint, the sensor can be triggered, turning on the regeneration flow stream.

In some embodiments, the regeneration assembly can comprise a gaseous flow stream for sparging the catholyte effluent flow stream with a gaseous oxygen-containing gas. The gaseous flow stream can comprise an air flow stream or an oxygen flow stream. Alternatively, the regeneration assembly can comprise a liquid flow stream, such as a hydrogen peroxide flow stream. In some embodiments, the fuel cell can collect gaseous byproducts from the catholyte effluent flow stream and then converting the gaseous byproducts to liquid forms for easy disposal.

In some embodiments, a combination of regeneration assemblies can be used to optimize the fuel cell efficiency. For example, the fuel cell can have air regeneration continuously running, meaning the fuel cell is normally under air regeneration. Gaseous regeneration, e.g., air regeneration flow, can cause minimum degradation to the catholyte flow stream, especially when used with gaseous collection assembly to remove un-reacted gaseous elements in the catholyte flow stream. Thus a continuous air regeneration process can be used to optimize the fuel cell efficiency.

In addition, additional regeneration capability, for example, using hydrogen peroxide, can be added, for example, to improve the power or performance of the fuel cell. A controller can be coupled to the hydrogen peroxide regeneration assembly, switching on the hydrogen peroxide regeneration under appropriate conditions, such as predetermined setpoints detected by a sensor.

Figure 15:
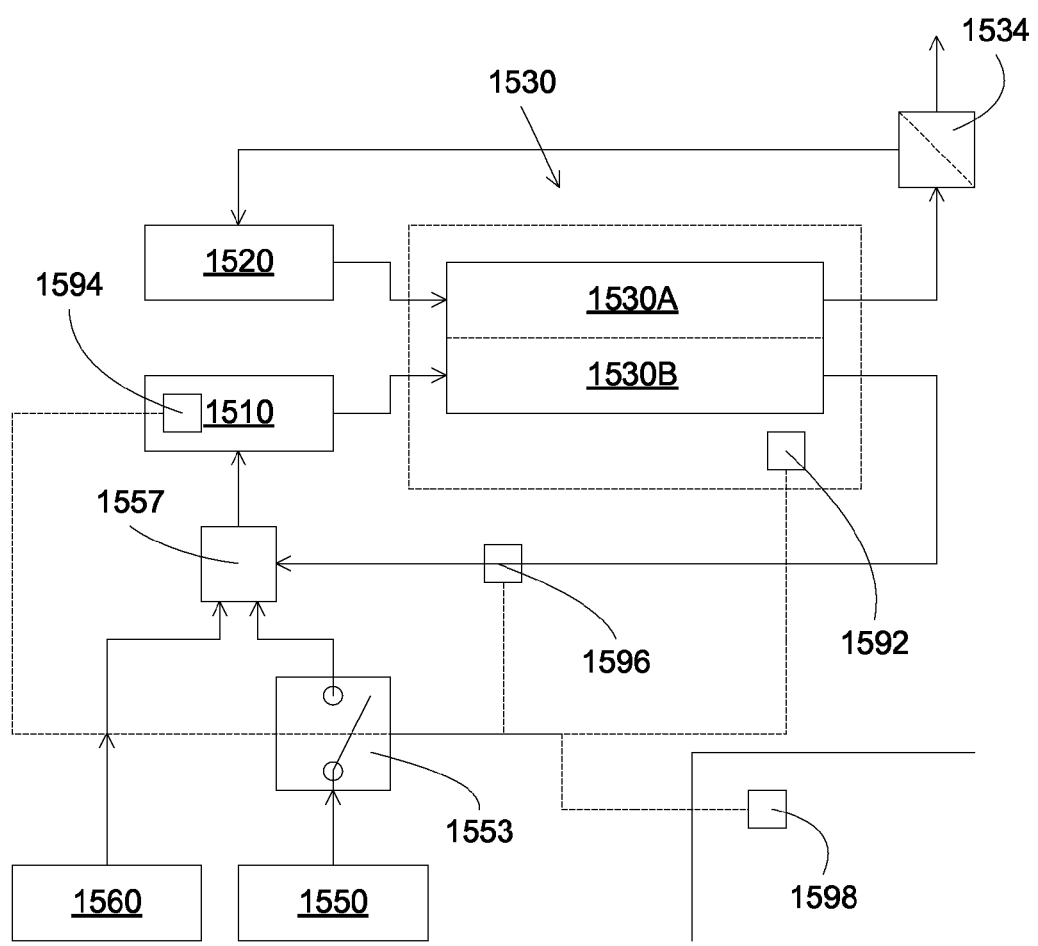
FIG. 15 illustrates an exemplary fuel cell system comprising a combination of regeneration assemblies according to some embodiments of the present invention.

FIG. 15 illustrates an exemplary fuel cell system comprising a combination of regeneration assemblies according to some embodiments of the present invention. The fuel cell system 1530 is similar to a fuel cell system in previous configuration, comprising anode 1530A and cathode 1530B, together with anode reservoir 1520 and cathode reservoir 1510 and degassing assembly 1534.

An air regeneration assembly 1560 is permanently coupled to the catholyte effluent flow stream at coupler 1557, for example, through a fan for providing a gaseous air oxidant flow stream. The air regeneration continuously supplies gaseous oxidant to the catholyte flow stream, and continuously regenerates the catholyte flow stream.

A liquid regeneration assembly 1550 is coupled to the coupler 1557 through a switchable connector 1555 to control the liquid regeneration process. The switchable connector 1555 can be manually controlled, for example, by an operator deciding the need for regeneration. Alternatively, the switchable connector can be automatically controlled through sensors which can monitor the conditions of the fuel cell, and can determine the need for regeneration. A sensor can be used to determine the concentration of the catholyte, for example, a concentration sensor 1594 positioned at the reservoir or a concentration sensor 1596 positioned at the catholyte effluent flow stream. Also, a sensor 1592 can monitor the power level of the fuel cell, or a sensor 1598 can count a characteristic of the fuel cell operation.

In some embodiments, the fuel cell can collect gaseous byproducts from the catholyte effluent flow stream and then converting the gaseous byproducts to liquid forms for easy disposal.

In some embodiments, the present invention discloses methods for regenerating a fuel cell, comprising intermittently regenerating an oxidant flow stream, for example, based on detected conditions. The intermittent regeneration can conserve the regeneration oxidant, such as liquid hydrogen peroxide, reduce the dilution of the catholyte (e.g., with the liquid oxidant), and stabilize the power generation of the fuel cell.

Figure 16A:
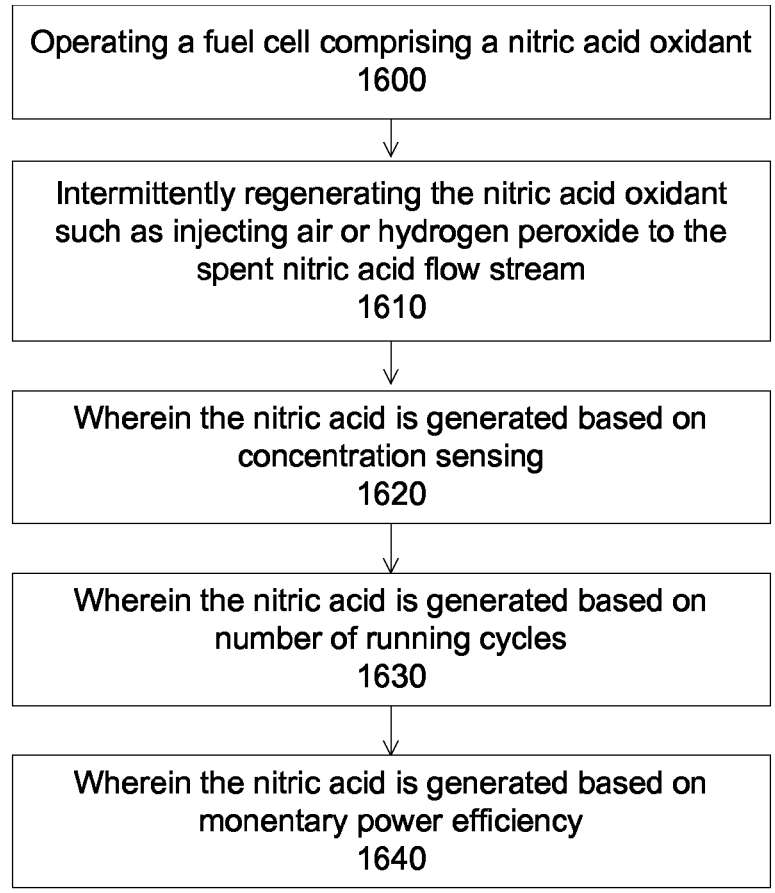
FIG. 16A illustrates an exemplary flow chart for waste disposal for a fuel cell according to some embodiments of the present invention.

FIG. 16A illustrates an exemplary flow chart for waste disposal for a fuel cell according to some embodiments of the present invention. In operation 1600, a fuel cell device is operated, comprising running a nitric acid oxidant as a catholyte flow stream together with a fuel anolyte flow stream. In operation 1610, the fuel cell is intermittently regenerated, such as by injecting gaseous oxidant (e.g., air or oxygen) or by injecting liquid oxidant (e.g., hydrogen peroxide) to the catholyte (e.g., the spent catholyte flow stream, the catholyte reservoir, or the catholyte flow stream). The regeneration process is performed based on detected conditions, such as based on concentration sensing (operation 1620), either at the catholyte reservoir, at the catholyte flow stream, or at the catholyte effluent flow stream. The detected conditions can comprise the operation characteristics of the fuel cell, such as the number of running cycles (operation 1630), the time that the fuel cell has been operated, the fuel that has been used, the power that has been generated. The conditions can include the momentary conditions of the fuel cell, such as the instantaneous power (operation 1640), voltage or current of the fuel cell. For example, if the power of the fuel cell is sensed to be momentarily dropped, regeneration is provided to improve the power condition. Other conditions can also be used, such as the ambient environment or the demanding load of the fuel cell.

In some embodiments, the gaseous byproducts in the catholyte are collected, forming a waste flow stream and is directed away from the catholyte flow stream. The waste stream can be brought to a liquid oxidant, such as hydrogen peroxide in a waste container to be converted to liquid form.

In some embodiments, the present invention discloses a nitric acid regeneration fuel cell system. The fuel cell system can include an anode and anode conduits fluidly connected to the anode. The anode conduits can include an inlet anode conduit for providing an anolyte flow stream to the anode. The anode conduits can include an outlet anode conduit for delivering an anolyte effluent flow stream from the anode. The anolyte flow stream can include a fuel for reacting at the anode. The fuel cell system can include a cathode and cathode conduits fluidly connected to the cathode. The cathode conduits can include an inlet cathode conduit for providing a catholyte flow stream to the cathode. The cathode conduits can include an outlet cathode conduit for delivering a catholyte effluent flow stream from the cathode. The catholyte flow stream can include nitric acid for reacting at the cathode. The catholyte flow stream can react at the cathode to yield gaseous nitrogen oxide in the catholyte effluent flow stream. The fuel cell system can include a fluidic controller coupled to the outlet cathode conduit, and a regeneration conduit fluidly connected to the fluidic controller. The fluidic controller can control an oxygen-containing flow stream to the catholyte effluent flow stream. The regeneration conduit can be configured to deliver the oxygen-containing flow stream for regenerating the catholyte effluent flow stream. The oxygen-containing flow stream can be configured to contact and react with the gaseous nitrogen oxide of the catholyte effluent flow stream. The fuel cell system can include a sensor for providing an input to the fluidic controller. The fluidic controller can control the oxygen-containing flow stream based on the input.

In some embodiments, the fluidic controller can include a valve, wherein the valve is controlled by the input supplied by the sensor. The sensor can be coupled to the catholyte effluent flow stream to measure a concentration of the catholyte effluent flow stream. The sensor can turn on the oxygen-containing flow stream to regenerate the catholyte effluent flow stream when the concentration is below a setpoint. The sensor can be coupled to a cathode reservoir to measure a concentration of the cathode reservoir. The sensor can turn on the oxygen-containing flow stream to regenerate the catholyte effluent flow stream when the concentration is below a setpoint. The sensor can be coupled to the fuel cell system to measure a power level of the fuel cell, The sensor can turn on the oxygen-containing flow stream to regenerate the catholyte effluent flow stream when the power level is below a setpoint. The sensor can be coupled to the fuel cell system to count a number of running cycles of the fuel cell, The sensor can turn on the oxygen-containing flow stream to regenerate the catholyte effluent flow stream when the number of running cycles is above a setpoint. The fuel system can include a second regeneration conduit fluidly connected to the catholyte effluent flow stream. The second regeneration conduit can include an air flow stream to continuously inject air into the catholyte effluent flow stream. The regeneration conduit can include a hydrogen peroxide flow stream to inject hydrogen peroxide into the catholyte effluent flow stream based on the fluidic controller. The oxygen-containing flow stream can include air or hydrogen peroxide. The fuel system can include a flow restrictor coupled to the catholyte effluent flow stream, or a catholyte reservoir. The catholyte reservoir can be fluidly connected to the catholyte inlet conduit and the catholyte outlet conduit. The catholyte flow stream can form a close-loop from the catholyte reservoir to the catholyte inlet conduit to the cathode to the catholyte outlet conduit and back to the catholyte reservoir. The anolyte flow stream can flowingly contact and pass through the anode. The catholyte flow stream can flowingly contact and pass by the cathode. The anode can include porous silicon to allow the anolyte flow stream to flow through. The cathode can include porous silicon to allow the catholyte flow stream to flow by. The oxygen-containing flow stream can react with the nitrogen oxide to yield a regenerated nitric acid flow stream joining the catholyte flow stream. A portion of the anode conduits, the cathode conduits and the regeneration conduit can include a microfluidic conduit disposed within a plate sandwiched between other plates. The regeneration conduit can be coupled to the outlet cathode conduit or a reservoir of the catholyte flow stream. The regeneration conduit can be coupled to the catholyte effluent flow stream through a porous element. The regeneration conduit can be coupled to the catholyte effluent flow stream through a check valve. The regeneration conduit can be coupled to the catholyte effluent flow stream through a membrane, wherein the membrane allows gaseous oxygen-containing flow stream to enter the catholyte effluent flow stream while preventing the liquid catholyte effluent flow stream from entering the oxygen-containing flow stream.

In some embodiments, the present invention discloses methods for regenerating a fuel cell, comprising intermittently regenerating a secondary oxidant flow stream, for example, based on detected conditions.

Figure 16B:
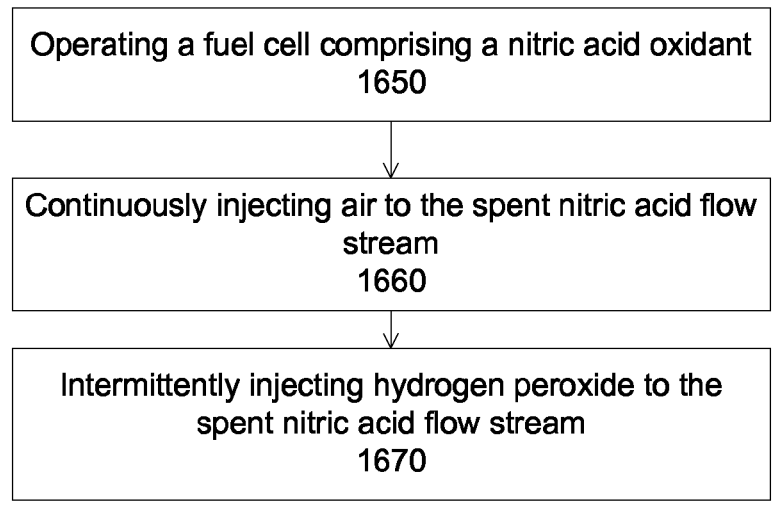
FIG. 16B illustrates an exemplary flow chart for waste disposal for a fuel cell according to some embodiments of the present invention.

FIG. 16B illustrates an exemplary flow chart for waste disposal for a fuel cell according to some embodiments of the present invention. In operation 1650, a fuel cell device is operated, comprising running a nitric acid oxidant as a catholyte flow stream together with a fuel anolyte flow stream. In operation 1660, a gaseous regeneration flow stream is sparging through the catholyte, preferably through the catholyte effluent flow stream to regenerate the nitrogen oxide back to nitric acid. In operation 1670, the fuel cell is intermittently regenerated by injecting liquid oxidant (e.g., hydrogen peroxide) to the catholyte (e.g., the spent catholyte flow stream, the catholyte reservoir, or the catholyte flow stream). The regeneration process is performed based on detected conditions, such as based on concentration sensing, either at the catholyte reservoir, at the catholyte flow stream, or at the catholyte effluent flow stream. The detected conditions can comprise the operation characteristics of the fuel cell, such as the number of running cycles, the time that the fuel cell has been operated, the fuel that has been used, the power that has been generated. The conditions can include the momentary conditions of the fuel cell, such as the instantaneous power, voltage or current of the fuel cell. For example, if the power of the fuel cell is sensed to be momentarily dropped, regeneration is provided to improve the power condition. Other conditions can also be used, such as the ambient environment or the demanding load of the fuel cell.

In some embodiments, the gaseous byproducts in the catholyte are collected, forming a waste flow stream and is directed away from the catholyte flow stream. The waste stream can be brought to a liquid oxidant, such as hydrogen peroxide in a waste container to be converted to liquid form.

In some embodiments, the present invention disclose a method for regenerating a fuel cell. The method can include flowing an anolyte flow stream to an anode, wherein the anolyte flow stream comprises a fuel for reacting at the anode; flowing a catholyte flow stream to a cathode, wherein the catholyte flow stream comprises nitric acid for reacting at the cathode to yield gaseous nitrogen oxide in a catholyte effluent flow stream; intermittently flowing an oxygen-containing flow stream to the catholyte effluent flow stream, wherein the oxygen-containing flow stream enters the catholyte effluent flow stream to react with the gaseous nitrogen oxide of the catholyte effluent flow stream; wherein the oxygen-containing flow stream is configured to enter the catholyte effluent flow stream based on an input from a sensor.

In some embodiments, the method can further include operating a valve to turn on or off the oxygen-containing flow stream based on the sensor, measuring a concentration of the catholyte effluent flow stream, wherein the oxygen-containing flow stream is turned on to regenerate the catholyte effluent flow stream when the concentration is below a setpoint, measuring a concentration of a cathode reservoir, wherein the oxygen-containing flow stream is turned on to regenerate the catholyte effluent flow stream when the concentration is below a setpoint, measuring a power level of the fuel cell, wherein the oxygen-containing flow stream is turned on to regenerate the catholyte effluent flow stream when the power level is below a setpoint, counting a number of running cycles of the fuel cell, wherein the oxygen-containing flow stream is turned on to regenerate the catholyte effluent flow stream when the number of running cycles is above a setpoint, continuously flowing a gas flow stream to the catholyte effluent flow stream, restricting the catholyte effluent flow stream, forming a close-loop from a catholyte reservoir to a catholyte inlet conduit to the cathode to a catholyte outlet conduit and back to the catholyte reservoir, or continuously flowing a regeneration gas flow stream to the catholyte effluent flow stream.

In some embodiments, the present invention discloses methods and systems for regenerating a fuel cell, comprising switching between different modes of oxidant regeneration, for example, based on detected conditions. For example, the fuel cell can comprise a regenerating assembly, coupled to the catholyte liquid for controllably regenerating the catholyte liquid. The regenerating assembly can comprise a controller, such as a controllable valve, for switching between different regenerating flow streams. The fuel cell can comprise a sensor for detecting conditions of the fuel cell, such as the concentration of the catholyte effluent flow stream or the catholyte reservoir, the power of fuel cell, or the number of running cycles of the fuel cell. In some embodiments, based on the inputs from the sensor, the regenerating assembly can switch between different modes of regeneration. Alternatively, the regenerating assembly can be manually switched, for example, when an operator desires higher fuel cell power or when the conditions are not appropriate for a certain mode of regeneration.

Figure 17:
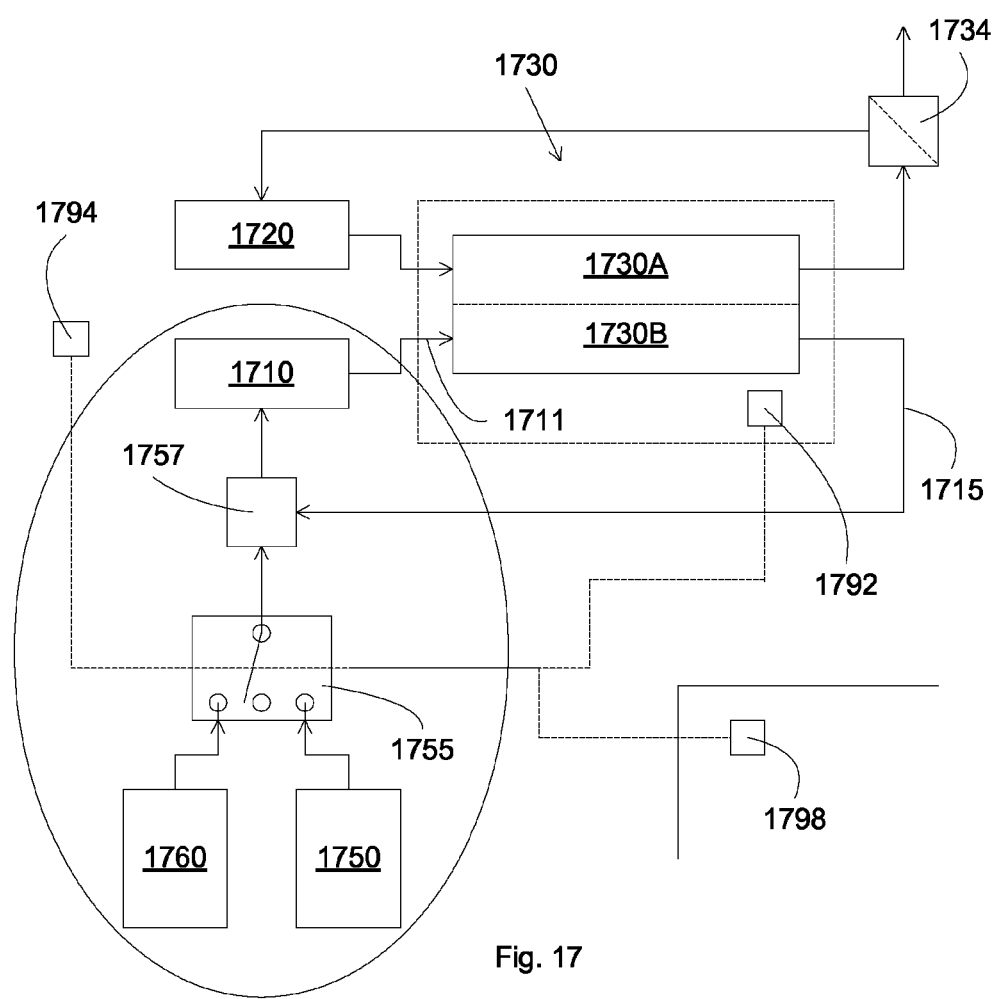
FIG. 17 illustrates an exemplary fuel cell system comprising switchable regeneration assemblies according to some embodiments of the present invention.

FIG. 17 illustrates an exemplary fuel cell system comprising switchable regeneration assemblies according to some embodiments of the present invention. The fuel cell system 1730 is similar to a fuel cell system in previous configuration, comprising anode 1730A and cathode 1730B, together with anode reservoir 1720 and cathode reservoir 1710 and degassing assembly 1734.

A coupler 1757 is coupled to the catholyte to deliver regeneration streams to the catholyte. As shown, the coupler is coupled to the catholyte effluent flow stream 1715, but the coupler can be coupled to the catholyte reservoir 1710 or the catholyte flow stream 1711. The coupler can be any connector, for example, a T coupler to be coupled to the catholyte effluent conduit, or a connector to allow one way flow of the regeneration flow stream to the catholyte as disclosed above (e.g., having a membrane, a one-way valve or a porous element).

A switchable connector 1755 is coupled to the coupler 1757 to enable a flow of regeneration oxidant, such as from regeneration assemblies 1750 or 1760. The switchable connector 1755 can be manually controlled, for example, by an operator deciding the need for regeneration. Alternatively, the switchable connector can be automatically controlled through sensors which can monitor the conditions of the fuel cell, and can determine the need for regeneration. A sensor can be used to determine the concentration of the catholyte, for example, a concentration sensor 1794 positioned at the reservoir or a concentration sensor 1796 positioned at the catholyte effluent flow stream. Also, a sensor 1792 can monitor the power level of the fuel cell, or a sensor 1798 can count a characteristic of the fuel cell operation.

In some embodiments, a controller is included to control the switchable connector 1755, switching between different regeneration assemblies, such as between regeneration with air and regeneration with hydrogen peroxide. The switchable connector can be manually controlled, or automatically controlled through a sensor. For example, the sensor can sense the air quality, and when the air quality is not appropriate for air regeneration, the sensor can output a signal to the controller for switching from air regeneration to liquid hydrogen peroxide regeneration. The switching can also be based on different conditions, such as the concentration of the catholyte liquid, or the power level of the fuel cell. In addition, the regeneration can be turned off, multiple regeneration can be used together.

Figure 18A:
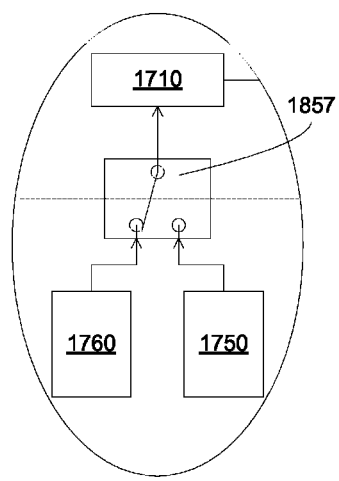
FIGS. 18A-18B illustrate other exemplary switchable connector configurations according to some embodiments of the present invention.
Figure 18B:
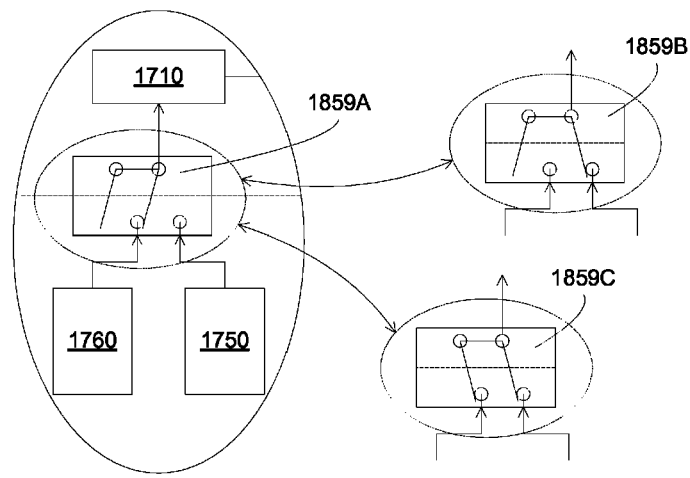

FIGS. 18A-18B illustrate other exemplary switchable connector configurations according to some embodiments of the present invention. In FIG. 18A, a switchable connector 1857 is coupled to two different regeneration assemblies 1760 and 1750. For example, the regeneration assembly 1760 can be a gaseous regeneration assembly, providing air or oxygen gas to the catholyte coupler 1710. The regeneration assembly 1750 can be a liquid regeneration assembly, providing hydrogen peroxide to the catholyte coupler 1710. In some embodiments, the controller can switch from regeneration with gaseous oxidant flow stream, such as air or oxygen-containing gas flow, to regeneration with liquid oxidant, such as liquid hydrogen peroxide. For example, the fuel cell can be normally operated under air regeneration 1760. When air quality is not suitable for air generation, or when high power is required, or when the concentration of the catholyte reagent is below a preset point, hydrogen peroxide regeneration 1750 can be switched on, replacing air regeneration.

FIG. 18B shows another switchable connector configuration with double pole switching. The connector configuration 1859A is shown as coupling to the regeneration assembly 1760. The connector configuration 1859B is shown as coupling to the regeneration assembly 1750. And the connector configuration 1859C is shown as coupling to both regeneration assemblies 1760 and 1750.

In some embodiments, the present invention discloses a nitric acid regeneration fuel cell system. The fuel cell system can include an anode and anode conduits fluidly connected to the anode. The anode conduits can include an inlet anode conduit for providing an anolyte flow stream to the anode. The anode conduits can include an outlet anode conduit for delivering an anolyte effluent flow stream from the anode. The anolyte flow stream can include a fuel for reacting at the anode. The fuel cell system can include a cathode and cathode conduits fluidly connected to the cathode. The cathode conduits can include an inlet cathode conduit for providing a catholyte flow stream to the cathode. The cathode conduits can include an outlet cathode conduit for delivering a catholyte effluent flow stream from the cathode. The catholyte flow stream can include nitric acid for reacting at the cathode, The catholyte flow stream can react at the cathode to yield gaseous nitrogen oxide in the catholyte effluent flow stream. The fuel cell system can include a controller coupled to the outlet cathode conduit. The fuel cell system can include a first regeneration conduit fluidly connected to the controller. The first regeneration conduit can be configured to deliver an air flow stream for regenerating the catholyte effluent flow stream. The fuel cell system can include a second regeneration conduit fluidly connected to the controller. The second regeneration conduit can be configured to deliver a hydrogen peroxide flow stream for regenerating the catholyte effluent flow stream. The controller can be configured to switch regeneration between the first regeneration conduit and the second regeneration conduit.

In some embodiments, the controller is further configured to switch to a no-regeneration operation. The controller can be manually activated. The controller can be automatically activated. The controller can be automatically activated based on air quality. The controller can be automatically activated based on a power level requirement. The fuel cell system can include a sensor for measuring air quality, wherein the sensor is coupled to the controller. The controller can be further configured to enable intermittent regeneration from the first regeneration conduit or from the second regeneration conduit. The fluidic controller can include a manual valve for manually switching regeneration between the first regeneration conduit and the second regeneration conduit. The fluidic controller can include a valve, wherein the valve is automatically controlled by a sensor.

In some embodiments, the present invention discloses methods for regenerating a fuel cell, comprising switching between different modes of oxidant regeneration, for example, based on detected conditions. In some embodiments, the present invention discloses methods for regenerating a fuel cell, comprising switching between air and liquid regeneration, for example, based on detected conditions.

Figure 19A:
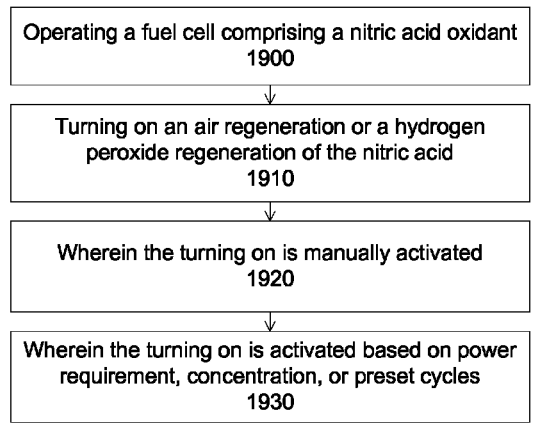
FIGS. 19A-19B illustrate exemplary flow charts for selecting regeneration assemblies according to some embodiments of the present invention.
Figure 19B:
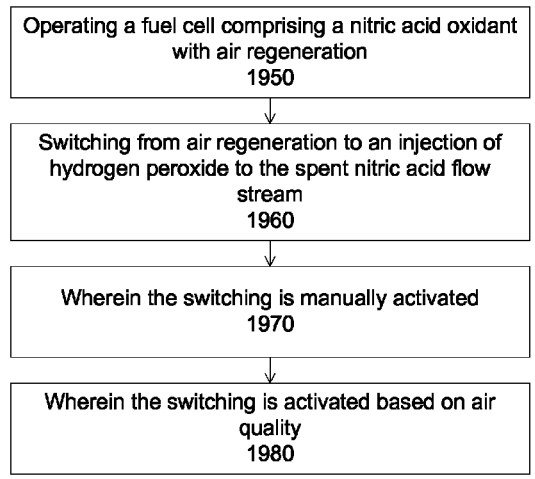

FIGS. 19A-19B illustrate exemplary flow charts for selecting regeneration assemblies according to some embodiments of the present invention. FIG. 19A shows a fuel cell operation, comprising switching on a regeneration assembly based on a detected condition. In operation 1900, a fuel cell device is operated, comprising running a nitric acid oxidant as a catholyte flow stream together with a fuel anolyte flow stream. In operation 1910, the fuel cell is regenerated, such as by turning on an air regeneration or a hydrogen peroxide regeneration. The regeneration process can be performed manually (operation 1920). Alternatively, the regeneration process can be automatically performed based on detected conditions, such as based on concentration sensing, either at the catholyte reservoir, at the catholyte flow stream, or at the catholyte effluent flow stream. The detected conditions can comprise the operation characteristics of the fuel cell, such as the number of running cycles, the time that the fuel cell has been operated, the fuel that has been used, the power that has been generated. The conditions can include the momentary conditions of the fuel cell, such as the instantaneous power, voltage or current of the fuel cell (operation 1930). For example, if the power of the fuel cell is sensed to be momentarily dropped, regeneration is provided to improve the power condition. Other conditions can also be used, such as the ambient environment or the demanding load of the fuel cell.

In some embodiments, the gaseous byproducts in the catholyte are collected, forming a waste flow stream and is directed away from the catholyte flow stream. The waste stream can be brought to a liquid oxidant, such as hydrogen peroxide in a waste container to be converted to liquid form.

FIG. 19B shows a fuel cell operation, comprising switching from an air regeneration to a hydrogen peroxide regeneration based on a detected condition. In operation 1950, a fuel cell device is operated, comprising running a nitric acid oxidant as a catholyte flow stream together with a fuel anolyte flow stream. A gaseous regeneration flow stream is sparging through the catholyte, preferably through the catholyte effluent flow stream to regenerate the nitrogen oxide back to nitric acid. In operation 1960, the fuel cell is switched from air regeneration to liquid hydrogen peroxide regeneration. The regeneration process can be performed manually (operation 1970). Alternatively, the regeneration process can be automatically performed based on detected conditions, such as based on concentration sensing, either at the catholyte reservoir, at the catholyte flow stream, or at the catholyte effluent flow stream. The detected conditions can comprise the operation characteristics of the fuel cell, such as the number of running cycles, the time that the fuel cell has been operated, the fuel that has been used, the power that has been generated. The conditions can include the momentary conditions of the fuel cell, such as the instantaneous power, voltage or current of the fuel cell (operation 1980). For example, if the power of the fuel cell is sensed to be momentarily dropped, regeneration is provided to improve the power condition. Other conditions can also be used, such as the ambient environment or the demanding load of the fuel cell.

In some embodiments, the gaseous byproducts in the catholyte are collected, forming a waste flow stream and is directed away from the catholyte flow stream. The waste stream can be brought to a liquid oxidant, such as hydrogen peroxide in a waste container to be converted to liquid form.

In some embodiments, the present invention discloses a method for regenerating a fuel cell. The method can include flowing an anolyte flow stream to an anode, wherein the anolyte flow stream comprises a fuel for reacting at the anode; flowing a catholyte flow stream to a cathode, wherein the catholyte flow stream comprises nitric acid for reacting at the cathode to yield gaseous nitrogen oxide in a catholyte effluent flow stream; switching between multiple oxygen-containing flow streams to regenerate the catholyte effluent flow stream.

In some embodiments, switching between multiple oxygen-containing flow streams can include switching between a gaseous flow stream and a liquid flow stream. Switching between multiple oxygen-containing flow streams can include switching between an air flow stream and a hydrogen peroxide flow stream. Switching between multiple oxygen-containing flow streams can include switching between an air flow stream and no flow stream. Switching between multiple oxygen-containing flow streams can include switching between a hydrogen peroxide flow stream and no flow stream. Switching between multiple oxygen-containing flow streams can include switching between an air flow stream, a hydrogen peroxide flow stream, and no flow stream. Switching between multiple oxygen-containing flow streams can include a manually switching process. Switching between multiple oxygen-containing flow streams can include an automatic switching process. Switching between multiple oxygen-containing flow streams can be based on air ambient quality. Switching between multiple oxygen-containing flow streams can be based on a power level requirement.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

What is claimed is:

1. A method for regenerating a fuel cell, the method comprising
   flowing an anolyte flow stream to an anode,
      wherein the anolyte flow stream comprises a fuel for reacting at the anode;
   flowing a catholyte flow stream to a cathode,
      wherein the catholyte flow stream comprises nitric acid for reacting at the cathode to yield gaseous nitrogen oxide in a catholyte effluent flow stream;
   flowing an oxygen-containing flow stream to the catholyte effluent flow stream,
      wherein the oxygen-containing flow stream bubbles through the catholyte effluent flow stream to react with the gaseous nitrogen oxide of the catholyte effluent flow stream;
   collecting a portion of the gaseous nitrogen oxide in the catholyte effluent flow stream;
   delivering the portion of the gaseous nitrogen oxide to a liquid oxidant reservoir,
      wherein the liquid oxidant reservoir is configured to react with the portion of the gaseous nitrogen oxide.

2. A method as in claim 1
   wherein the oxygen-containing flow stream comprises air, and
   wherein the oxidant reservoir comprises hydrogen peroxide.

3. A method as in claim 1 further comprising
   contacting and passing the anolyte flow stream flowingly through the anode, and
   contacting and passing the catholyte flow stream flowingly by the cathode.

4. A method as in claim 1 further comprising
   reacting the oxygen-containing flow stream with the nitrogen oxide to yield a regenerated nitric acid flow stream joining the catholyte flow stream.

5. A method as in claim 1 further comprising
   reacting the liquid oxidant reservoir with the portion of the nitrogen oxide to yield nitric acid.

6. A method as in claim 1 further comprising
   flowing the oxygen-containing flow stream to the catholyte effluent flow stream from a reservoir of the catholyte flow stream.

7. A method as in claim 1 further comprising
   flowing the oxygen-containing flow stream to the catholyte effluent flow stream through a porous element.

8. A method as in claim 1 further comprising
   flowing the oxygen-containing flow stream to the catholyte effluent flow stream through a membrane, wherein the membrane allows gaseous oxygen-containing flow stream to enter the catholyte effluent flow stream while preventing the liquid catholyte effluent flow stream from entering the oxygen-containing flow stream.

9. A method as in claim 1 further comprising
   restricting the catholyte effluent flow stream.

10. A method as in claim 1 further comprising
    forming a close-loop from a catholyte reservoir to the catholyte inlet conduit to the cathode to the catholyte outlet conduit and back to the catholyte reservoir.

* * * * *